United States Patent
Cronie et al.

(10) Patent No.: US 9,288,089 B2
(45) Date of Patent: *Mar. 15, 2016

(54) ORTHOGONAL DIFFERENTIAL VECTOR SIGNALING

(75) Inventors: Harm Cronie, Lausanne (CH); Amin Shokrollahi, Preverenges (CH)

(73) Assignee: ECOLE POLYTECHNIQUE FEDERALE DE LAUSANNE (EPFL) (CH)

( * ) Notice: Subject to any disclaimer, the term of this patent is extended or adjusted under 35 U.S.C. 154(b) by 515 days.

This patent is subject to a terminal disclaimer.

(21) Appl. No.: 12/784,414

(22) Filed: May 20, 2010

(65) Prior Publication Data

US 2011/0268225 A1 Nov. 3, 2011

Related U.S. Application Data

(60) Provisional application No. 61/330,107, filed on Apr. 30, 2010.

(51) Int. Cl.
| | |
|---|---|
| *H04J 13/00* | (2011.01) |
| *H04L 25/49* | (2006.01) |
| *H04L 25/02* | (2006.01) |

(52) U.S. Cl.
CPC ........ *H04L 25/4906* (2013.01); *H04L 25/0272* (2013.01)

(58) Field of Classification Search
USPC ........... 370/476, 208, 420; 708/400; 375/256, 375/257, 243
See application file for complete search history.

(56) References Cited

U.S. PATENT DOCUMENTS

| | | | |
|---|---|---|---|
| 3,636,463 A | | 1/1972 | Ongkiehong |
| 3,939,468 A | | 2/1976 | Mastin |
| 4,163,258 A | * | 7/1979 | Ebihara et al. ................ 348/618 |
| 4,181,967 A | | 1/1980 | Nash et al. |
| 4,206,316 A | | 6/1980 | Burnsweig et al. |

(Continued)

FOREIGN PATENT DOCUMENTS

| | | |
|---|---|---|
| CN | 101478286 | 7/2009 |
| EP | 2039221 B1 | 3/2009 |

(Continued)

OTHER PUBLICATIONS

Aliazam Abbasfar, Generalized Differential Vector Signalling, 2009, 2009 IEEE international conference on Coomunications, 2009, p. 1-5.*

(Continued)

*Primary Examiner* — Kevin C Harper
*Assistant Examiner* — Derrick V Rose
(74) *Attorney, Agent, or Firm* — Invention Mine LLC

(57) ABSTRACT

Using a transformation based at least in part on a non-simple orthogonal or unitary matrix, data may be transmitted over a data bus in a manner that is resilient to one or more types of signal noise, that does not require a common reference at the transmission and acquisition points, and/or that has a pin-efficiency that is greater than 50% and may approach that of single-ended signaling. Such transformations may be implemented in hardware in an efficient manner. Hybrid transformers that apply such transformations to selected subsets of signals to be transmitted may be used to adapt to various signal set sizes and/or transmission environment properties including noise and physical space requirements of given transmission environments.

25 Claims, 15 Drawing Sheets

(56) References Cited

U.S. PATENT DOCUMENTS

| | | | |
|---|---|---|---|
| 4,486,739 A | 12/1984 | Franaszek et al. | |
| 4,499,550 A | 2/1985 | Ray et al. | |
| 4,580,162 A | 4/1986 | Mori | |
| 4,864,303 A | 9/1989 | Ofek | |
| 5,053,974 A | 10/1991 | Penz | |
| 5,166,956 A | 11/1992 | Baltus et al. | |
| 5,168,509 A | 12/1992 | Nakamura et al. | |
| 5,283,761 A | 2/1994 | Gillingham | |
| 5,412,689 A | 5/1995 | Chan et al. | |
| 5,511,119 A | 4/1996 | Lechleider | |
| 5,553,097 A | 9/1996 | Dagher | |
| 5,599,550 A | 2/1997 | Kohlruss et al. | |
| 5,659,353 A | 8/1997 | Kostreski | |
| 5,825,808 A * | 10/1998 | Hershey et al. | 375/146 |
| 5,995,016 A | 11/1999 | Perino | |
| 6,005,895 A | 12/1999 | Perino et al. | |
| 6,084,883 A | 7/2000 | Norrell et al. | |
| 6,172,634 B1 | 1/2001 | Leonowich et al. | |
| 6,175,230 B1 | 1/2001 | Hamblin et al. | |
| 6,278,740 B1 | 8/2001 | Nordyke | |
| 6,359,931 B1 | 3/2002 | Perino et al. | |
| 6,404,820 B1 | 6/2002 | Postol | |
| 6,417,737 B1 | 7/2002 | Moloudi et al. | |
| 6,452,420 B1 | 9/2002 | Wong | |
| 6,504,875 B2 | 1/2003 | Perino et al. | |
| 6,509,773 B2 | 1/2003 | Buchwald | |
| 6,556,628 B1 | 4/2003 | Poulton et al. | |
| 6,563,382 B1 | 5/2003 | Yang et al. | |
| 6,621,427 B2 | 9/2003 | Greenstreet | |
| 6,650,638 B1 | 11/2003 | Walker et al. | |
| 6,661,355 B2 | 12/2003 | Cornelius et al. | |
| 6,686,879 B2 | 2/2004 | Shattil | |
| 6,766,342 B2 * | 7/2004 | Kechriotis | 708/400 |
| 6,839,429 B1 * | 1/2005 | Gaikwad et al. | 379/417 |
| 6,854,030 B2 | 2/2005 | Perino et al. | |
| 6,954,492 B1 | 10/2005 | Williams | |
| 6,963,622 B2 | 11/2005 | Eroz et al. | |
| 6,990,138 B2 | 1/2006 | Bejjani et al. | |
| 6,991,038 B2 | 1/2006 | Guesnon et al. | |
| 6,999,516 B1 | 2/2006 | Rajan | |
| 7,053,802 B2 | 5/2006 | Cornelius | |
| 7,085,153 B2 | 8/2006 | Ferrant et al. | |
| 7,085,336 B2 | 8/2006 | Lee et al. | |
| 7,127,003 B2 | 10/2006 | Rajan et al. | |
| 7,130,944 B2 | 10/2006 | Perino et al. | |
| 7,142,612 B2 | 11/2006 | Horowitz et al. | |
| 7,164,631 B2 | 1/2007 | Tateishi et al. | |
| 7,167,019 B2 | 1/2007 | Broyde et al. | |
| 7,180,949 B2 * | 2/2007 | Kleveland et al. | 375/256 |
| 7,184,483 B2 | 2/2007 | Rajan | |
| 7,356,213 B1 | 4/2008 | Cunningham et al. | |
| 7,358,869 B1 | 4/2008 | Chiarulli et al. | |
| 7,362,130 B2 | 4/2008 | Broyde et al. | |
| 7,370,264 B2 | 5/2008 | Worley | |
| 7,462,956 B2 | 12/2008 | Lan et al. | |
| 7,535,957 B2 | 5/2009 | Ozawa et al. | |
| 7,633,850 B2 | 12/2009 | Ahn | |
| 7,656,321 B2 | 2/2010 | Wang | |
| 7,694,204 B2 | 4/2010 | Schmidt et al. | |
| 7,706,524 B2 | 4/2010 | Zerbe | |
| 7,746,764 B2 * | 6/2010 | Rawlins et al. | 370/208 |
| 7,787,572 B2 | 8/2010 | Scharf et al. | |
| 7,804,361 B2 | 9/2010 | Lim et al. | |
| 7,808,883 B2 | 10/2010 | Green | |
| 7,882,413 B2 | 2/2011 | Chen et al. | |
| 7,933,770 B2 | 4/2011 | Kruger et al. | |
| 8,036,300 B2 | 10/2011 | Evans et al. | |
| 8,050,332 B2 | 11/2011 | Chung et al. | |
| 8,064,535 B2 | 11/2011 | Wiley | |
| 8,085,172 B2 | 12/2011 | Li | |
| 8,091,006 B2 | 1/2012 | Prasad et al. | |
| 8,159,375 B2 | 4/2012 | Abbasfar | |
| 8,159,376 B2 | 4/2012 | Abbasfar | |
| 8,185,807 B2 | 5/2012 | Oh et al. | |
| 8,199,863 B2 | 6/2012 | Chen et al. | |
| 8,218,670 B2 | 7/2012 | Abou Rjeily | |
| 8,245,094 B2 | 8/2012 | Jiang | |
| 8,279,094 B2 | 10/2012 | Abbasfar | |
| 8,429,495 B2 | 4/2013 | Przybylski | |
| 8,442,099 B1 | 5/2013 | Sederat | |
| 8,442,210 B2 | 5/2013 | Zerbe | |
| 8,443,223 B2 | 5/2013 | Abbasfar | |
| 8,451,913 B2 | 5/2013 | Oh | |
| 8,462,891 B2 | 6/2013 | Kizer et al. | |
| 8,498,344 B2 | 7/2013 | Wilson et al. | |
| 8,520,493 B2 | 8/2013 | Goulahsen | |
| 8,539,318 B2 | 9/2013 | Cronie et al. | |
| 8,547,272 B2 | 10/2013 | Nestler et al. | |
| 8,588,254 B2 | 11/2013 | Diab et al. | |
| 8,588,280 B2 | 11/2013 | Oh et al. | |
| 8,593,305 B1 | 11/2013 | Tajalli et al. | |
| 8,620,166 B2 | 12/2013 | Guha | |
| 8,649,445 B2 | 2/2014 | Cronie et al. | |
| 8,649,460 B2 | 2/2014 | Ware et al. | |
| 8,711,919 B2 | 4/2014 | Kumar | |
| 8,718,184 B1 | 5/2014 | Cronie | |
| 8,773,964 B2 | 7/2014 | Hsueh | |
| 8,782,578 B2 | 7/2014 | Tell | |
| 8,897,134 B2 | 11/2014 | Kern et al. | |
| 8,989,317 B1 | 3/2015 | Holden | |
| 9,015,566 B2 | 4/2015 | Cronie | |
| 9,172,412 B2 | 10/2015 | Kim et al. | |
| 2002/0034191 A1 | 3/2002 | Shattil | |
| 2002/0044316 A1 * | 4/2002 | Myers | H04J 14/002 398/43 |
| 2002/0057592 A1 | 5/2002 | Robb | |
| 2003/0071745 A1 * | 4/2003 | Greenstreet | 341/58 |
| 2003/0128656 A1 | 7/2003 | Scarpa | |
| 2003/0146783 A1 | 8/2003 | Bandy et al. | |
| 2005/0004999 A1 * | 1/2005 | Moore et al. | 709/220 |
| 2005/0149833 A1 * | 7/2005 | Worley | H03M 13/19 714/781 |
| 2005/0152385 A1 * | 7/2005 | Cioffi | 370/420 |
| 2005/0174841 A1 | 8/2005 | Ho | |
| 2005/0213686 A1 | 9/2005 | Love et al. | |
| 2006/0159005 A1 * | 7/2006 | Rawlins et al. | 370/208 |
| 2007/0263711 A1 | 11/2007 | Kramer et al. | |
| 2008/0043677 A1 | 2/2008 | Kim | |
| 2008/0104374 A1 | 5/2008 | Mohamed | |
| 2008/0159448 A1 | 7/2008 | Dankwa | |
| 2008/0273623 A1 * | 11/2008 | Chung et al. | 375/295 |
| 2009/0059782 A1 * | 3/2009 | Cole | 370/206 |
| 2009/0092196 A1 | 4/2009 | Okunev | |
| 2009/0163612 A1 | 6/2009 | Lee et al. | |
| 2009/0185636 A1 | 7/2009 | Palotai et al. | |
| 2009/0193159 A1 * | 7/2009 | Li | G06F 1/3253 710/35 |
| 2010/0180143 A1 | 7/2010 | Ware et al. | |
| 2010/0205506 A1 | 8/2010 | Hara | |
| 2011/0235501 A1 * | 9/2011 | Goulahsen | 370/203 |
| 2011/0268225 A1 | 11/2011 | Cronie et al. | |
| 2011/0299555 A1 | 12/2011 | Cronie et al. | |
| 2011/0302478 A1 * | 12/2011 | Cronie et al. | 714/777 |
| 2013/0010892 A1 | 1/2013 | Cronie et al. | |
| 2013/0051162 A1 | 2/2013 | Amirkhany et al. | |
| 2015/0078479 A1 | 3/2015 | Whitby-Strevens | |

FOREIGN PATENT DOCUMENTS

| | | |
|---|---|---|
| JP | 2003163612 | 6/2003 |
| WO | 2009084121 | 7/2009 |
| WO | 2010/031824 A | 3/2010 |
| WO | 2010031824 | 3/2010 |
| WO | 2011119359 | 9/2011 |

OTHER PUBLICATIONS

David Slepian, Permutation Modulation, IEEE, vol. 53, No. 3, Mar. 1965, pp. 228-236.

International Search Report and Written Opinion for PCT/EP2011/002170 mailed Jul. 14, 2011.

Mircea Stan et al., Bus-Invert Coding for Low-Power I/O, IEEE Transactions on Very Large Scale Integration (VLSI) Systems, vol. 3, No. 1, Mar. 1995, pp. 49-58.

(56) References Cited

OTHER PUBLICATIONS

Luca Tallini et al., Transmission Time Analysis for the Parallel Asynchronous Communication Scheme, IEEE Transactions on Computers, vol. 52, No. 5, May 2003, pp. 558-571.
International Search Report and Written Opinion for PCT/EP2012/052767 mailed May 11, 2012.
Notice of Allowance dated May 20, 2013 in related U.S. Appl. No. 12/982,777 filed Dec. 30, 2010.
International Search Report and Written Opinion for PCT/EP2011/059279 mailed Sep. 22, 2011.
International Search Report and Written Opinion for PCT/EP2011/074219 mailed Jul. 4, 2012.
A.G. Burr, Spherical Codes for M-ARY Code Shift Keying, University of York, Apr. 2, 1989, pp. 67-72, United Kingdom.
Thomas Ericson et al., Spherical Codes Generated by Binary Partitions of Symmetric Pointsets, IEEE Transactions on Information Theory, vol. 41, No. 1, Jan. 1995, pp. 107-129.
Kamran Farzan et al., Coding Schemes for Chip-to-Chip Interconnect Applications, IEEE Transactions on Very Large Scale Integration (VLSI) Systems, vol. 14, No. 4, Apr. 2006, pp. 393-406.
Abbasfar, A. "Generalized Differential Vector Signaling," *IEEE International Conference on Communications, ICC '09*, (Jun. 14, 2009), pp. 1-5.
DaSilva, et al., "Multicarrier Orthogonal CDMA Signals for Quasi-Synchronous Communication Systems," *IEEE Journal on Selected Areas in Communications*, vol. 12, No. 5 (Jun. 1, 1994), pp. 842-852.
Wang et al., "Applying CDMA Technique to Network-on-Chip," *IEEE Transactions on Very Large Scale Integration (VLSI) Systems*, vol. 15, No. 10 (Oct. 1, 2007), pp. 1091-1100.
Zouhair Ben-Neticha et al., "The "stretched"-Golay and other codes for high-SNR finite-delay quantization of the Gaussian source at 1/2 Bit per sample", IEEE Transactions on Communicatins, vol. 38, No. 12, Dec. 1, 1990, pp. 2089-2093, XP000203339, ISSN: 0090-6779, DOI: 10.1109126.64647.
International Search Report and Written Opinion of the International Searching Authority, mailed Nov. 5, 2012, in International Patent Application S.N. PCT/EP2012/052767, 7 pages.
International Search Report and Written Opinion for PCT/US14/052986 mailed Nov. 24, 2014.
Healey, A., et al., "A Comparison of 25 Gbps NRZ & PAM-4 Modulation used in Legacy & Premium Backplane Channels", DesignCon 2012, 16 pages.
International Search Report for PCT/US2014/053563, dated Nov. 11, 2014, 2 pages.
International Search Report and Written Opinion from PCT/US2014/034220 mailed Aug. 21, 2014.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Poulton, et al., "Multiwire Differential Signaling", UNC-CH Department of Computer Science Version 1.1, Aug. 6, 2003.
Skliar et al., A Method for the Analysis of Signals: the Square-Wave Method, Mar. 2008, Revista de Matematica: Teoria y Aplicationes, pp. 09-129.
Notification of Transmittal of the International Search Report and the Written Opinion of the International Searching Authority, or the Declaration for PCT/EP2013/002681, dated Feb. 25, 2014, 15 pages.
Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/ tcomm.2003.822168, pp. 55-59.
Notification of Transmittal of International Search Report and the Written Opinion of the International Searching Authority, for PCT/US2015/018363, mailed Jun. 18, 2015, 13 pages.
Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pp., http.//www.retrothing.com/2006108/classic_analog_html.
Schneider, J., et al., "ELEC301 Project: Building an Analog Computer," Dec. 19, 1999, 8 pages, http://www.clear.rice.edu/elec301/Projects99/anIgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
"Introduction to: Analog Computers and the DSPACE System," Course Material ECE 5230 Spring 2008, Utah State University, www.coursehero.com, 12 pages.
Notification of Transmittal of the International Search Report and the Written Opinion of the International Searching Authority, or the Declaration, for PCT/US2014/015840, dated May 20, 2014. 11 pages.
Notification of Transmittal of the International Search Report and the Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, dated Mar. 3, 2015, for PCT/US2014/066893, 9 pages.
International Preliminary Report on Patentability for PCT/US2014/015840, dated Aug. 11, 2015, 7 pages.
Jiang, A., et al., "Rank Modulation for Flash Memories", IEEE Transactions of Information Theory, Jun. 2006, vol. 55, No. 6, pp. 2659-2673.
Oh, et al., Pseudo-Differential Vector Signaling for Noise Reduction in Single-Ended Signaling, DesignCon 2009.
Loh, M., et al., "A 3x9 Gb/s Shared, All-Digital CDR for High-Speed, High-Density I/O", Matthew Loh, IEEE Journal of Solid-State Circuits, Vo. 47, No. 3, Mar. 2012.
Notification of Transmittal of the International Search Report and the Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
International Preliminary Report on Patentability for PCT/US2014/034220, dated Oct. 20, 2015, 5 pages.

\* cited by examiner

Fig. 9

$$\frac{1}{\sqrt{12}}$$

ORTHOGONAL DIFFERENTIAL VECTOR SIGNALING

CROSS-REFERENCE TO RELATED APPLICATIONS

This application claims the benefit of U.S. Provisional Application No. 61/330,107, filed Apr. 30, 2010, titled "Orthogonal Differential Vector Signaling," the contents of which are hereby incorporated in its entirety by reference.

FIELD OF THE INVENTION

The present invention relates to communications in general and in particular to transmission of signals capable of conveying information.

BACKGROUND OF THE INVENTION

Transmission of digital information on a physical device such as on wires on a computer chip, through optical cables, through twisted pair copper wires, or through cables such as the High-Definition Multimedia Interface (HDMI), and other such physical, tangible and/or non-transitory transmission media, has been the subject of much investigation. Each piece of the information to be transmitted may be associated with a continuous time waveform in such a way that different pieces of information are distinguishable from one another by means of their corresponding waveform. For example, where information is transmitted on wires using physical voltages, the pieces of information could correspond to the possible values 0 or 1 of a bit, and a 0 could correspond to a voltage of +V with respect to fixed reference voltage, whereas a 1 could correspond to a voltage of −V with respect to the same reference voltage. Where higher modulation is used, the pieces of information could correspond to all possible combinations of a larger number of bits, and each such group of bits could correspond to a different phase of the waveform, or to a different amplitude, or to a different frequency. Information may be encoded into a waveform by altering one or more of its properties. This waveform may be converted into a physical, tangible and/or non-transitory embodiment that can be carried by the transmission medium. The process of varying one or more properties of a waveform with respect to a baseline modulating signal is herein called the process of modulation. The act of transmitting the information using a modulated signal is herein referred to as signaling.

One of the more commonly used methods for transmitting signals over wires is the single-ended signaling method. Where information is transmitted by either applying different voltage levels (voltage mode) on the wire with respect to a reference or sending a current (current mode) with different strengths into the wire. When using voltages, one wire carries a varying voltage that represents the signal while the other wire is connected to a reference voltage which is usually the ground. When using currents, the common return path of the current is usually ground. Hence, in a single-ended signaling method each signal source is connected to the data acquisition interface using one signal path. At the data acquisition interface, often voltages are measured, either, directly or by terminating the wire by means of a load to a reference. The result of the measurement is proportional to the difference between the signal and the reference, often "ground" or "earth", at the acquisition point. The method relies on the signal source reference to be the same as the data acquisition point's reference. However, in reality they can be different for a variety of physical reasons. This is especially problematic when signals have to traverse longer distances (for example in twisted pair copper wires), or when the frequencies of the signals are very high (for example in high throughput on-chip communication). Using ground as a reference and connecting the grounds on both ends can drive large currents known as ground loops, which can lead to significant errors when using single-ended inputs. Furthermore, it is not always possible to have a common electrical reference at both sides of the wires. This can be the case in optical communications. Moreover, single-ended inputs can be susceptible to noise (i.e., unwanted signal contaminations). For example, such noise can be added because electrical signal wires act as aerials, and hence pick up environmental electrical activity. Single-ended signaling methods do not always provide sufficient protection against these sources of noise, especially for high speed communications.

To combat these problems, a different form of signaling called differential signaling is used. In conventional differential signaling, information is transmitted using two complementary signals sent on two separate wires, for example, in the form of a voltage difference between the wires or current strength and direction in the wires. The output signal is then the difference between these two complementary signals. The technique can be used for both analog signaling, for example in some audio systems, and in digital signaling. Examples include, but are not limited to standards such as the RS-422, RS-485, the twisted-pair Ethernet, the Peripheral Component Interconnect (PCI) Express, the Universal Serial Bus (USB), serial ATA, Transition Minimized Differential Signaling (TMDS) used in DVI and HDMI cables, or the FireWire interface. While sending complementary signals on the two wires of a differential input is advantageous in some applications, it is not strictly required. Instead, it is possible to send the information on the second wire in such a way that the difference in voltage between the second and the first wire is +V or −V for some fixed voltage V. At the acquisition point, the receiving device reads the difference between the two signals. Since the receiver ignores the wires' voltages with respect to ground, small changes in ground potential between transmitter and receiver do not affect the receiver's ability to detect the signal. One of the main advantages of differential signaling is its resistance to "common-mode noise." This is noise that affects both wires in the system in the same way (for example through interference caused by nearby wires). Furthermore, compared to single-ended signaling, the signal swing at the receiver is typically larger which can result in better noise performance.

In many practical scenarios, communication takes place by sending more than one bit of information a time. For example, in a 32-bit bus system, 32 bits of binary information may be sent simultaneously. In such cases, multiple single-ended, or differential, signaling paths are used in parallel, one for each bit. A disadvantage of conventional differential signaling in these practical scenarios is the large number of wires needed: to each bit there are two wires associated. The ratio between the number of bits and the number of wires used to transmit these bits is herein called the pin-efficiency of the system. This number is 1.0 (or 100%) for single-ended signaling, whereas it is 0.5 (or 50%) for differential signaling. In many communication scenarios, this makes the use of differential signaling less desirable. To combat this problem, in some cases the signals are serialized and sent over only one, or only a few pairs of differential signal paths. However, this method has the disadvantage of requiring the transmission to take place at a higher frequency in order to maintain a given throughput. However, transmission at higher frequency requires more energy both in order to realize the higher frequency of operation, and to combat noise associated with this mode of operation.

What is needed is a signaling method that, at least, retains the resilience of differential signaling against various modes of noise, and has a pin-efficiency that can approach that of single-ended signaling. Embodiments of the invention are directed toward solving these and other problems individually and collectively.

BRIEF SUMMARY OF THE INVENTION

Using a transformation based at least in part on a non-simple orthogonal or unitary matrix, data may be transmitted over a data bus in a manner that is resilient to one or more types of signal noise, that does not require a common reference at the transmission and acquisition points, and/or that has a pin-efficiency that is greater than 50% and may approach that of single-ended signaling. Such transformations may be implemented in hardware in an efficient manner. Hybrid transformers that apply such transformations to selected subsets of signals to be transmitted may be used to adapt to various signal set sizes and/or transmission environment properties including noise and physical space requirements of given transmission environments.

This Brief Summary of the Invention is provided to introduce a selection of concepts in a simplified form that are further described below in the Detailed Description of the Invention. This Brief Summary of the Invention is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description of the Invention and the included figures.

BRIEF DESCRIPTION OF THE DRAWINGS

Various embodiments in accordance with the present disclosure will be described with reference to the drawings, in which:

FIG. 9 is a representation of a Hadamard matrix of size 12 in accordance with at least one embodiment of the invention;

Same numbers are used throughout the disclosure and figures to reference like components and features.

DETAILED DESCRIPTION OF THE INVENTION

The System Setting

Figure 1:
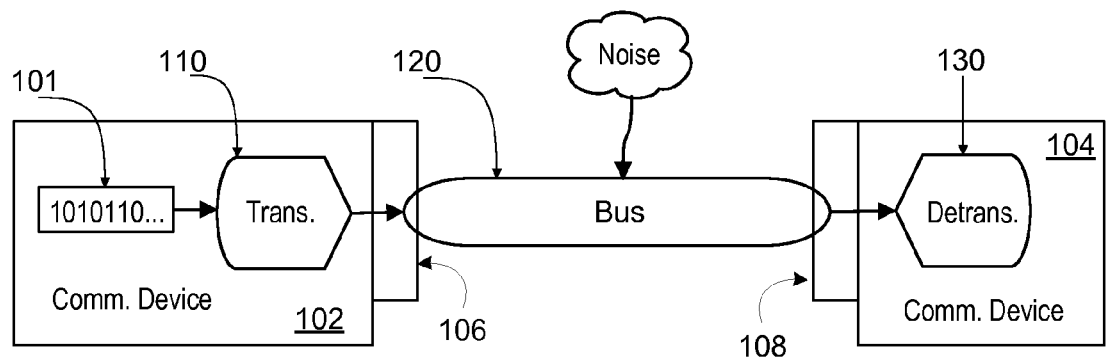
FIG. 1 is a schematic diagram depicting aspects of an example communication in accordance with at least one embodiment of the invention.

FIG. 1 illustrates an example communication environment 100 including two devices 102, 104 capable of communication connected by a physical communication bus 120. The communication between the two devices 102, 104 takes place on the bus 120. The bus 120 is an example of a medium on which signal transmission can take place. The information to be transmitted may be stored in an information storage medium 101, or it may be available substantially concurrently with the transmission. In at least one embodiment, the information may be present as a sequence of bits, but each embodiment is not so limited. In at least one embodiment the bits are represented by a signal. A common signal to represent information in digital electronics is a non-return-to-zero (NRZ) signal. The bits are encoded in the amplitude of a square waveform where for example an amplitude of V represents a logical 0 and an amplitude of 0 represents a logical 1. More complicated signals to represent the information are possible also. An example is an Orthogonal Frequency Division Modulated (OFDM) waveform that is generated by a digital subscriber line (DSL) modem. These signals often correspond to a physical quantities such as a voltage levels or currents in a circuit. However, this is not necessary. For example, a signal may be defined by the content of a storage medium (e.g., memory) of an electronic component. In applications where bits may be represented in a non-physical form, FIG. 1 can be augmented to have a converter between units 101 and 110 whose task is to transform the bits into a physical form. As can be seen by those of skill in the art, the methods disclosed in this application also apply when the atomic parts of the information are not bits, but belong to a larger alphabet, wherein each alphabet element can correspond to one or more properties of a signal.

The information in the form of bits or a signal representing the information may be input into a transformer 110. A task of the transformer 110 is to transform the information in such a way that it can be transmitted via the signal bus 120. For example, transformer 110 could be generating a sequence of waveforms corresponding to the individual bits of the information in the information storage medium 101. An example of such a waveform is non-return-to-zero (NRZ) signaling where a logical 0 and a logical 1 are represented by a signal level that is equal to a or −a over a time interval or cycle of T seconds which in some embodiments of the present invention can be a voltage difference to a given reference. Another example is an optical modulator which transforms a 0 or a 1 into light of wavelengths $\lambda_0$ and $\lambda_1$ or modulates the intensity of the generated light beam according to the information. Other types of modulation can also be applied to the present disclosure, for example, modulation by frequency, or by signal phase. The transformer 110 can include signal amplification, signal filtering and/or other suitable signal processing functions devised to prepare the signal for a transport medium of the bus 120. In addition to this, the task of the transformer may include creating a different set of signals from which the original signals can be recovered, and which are resistant to various types of noise on the bus 120. Example operations of the transformer 110 in accordance with at least one embodiment of the invention will be described in greater detail below.

Once the signal input into the transformer 110 is transformed, it may be transmitted on the bus 120. The bus 120 may include one or more signal paths including one or more physical media capable of transporting the transformed signal set from one end of the bus 120 to the other end of the bus 120. In at least one embodiment of the invention, the ends of the bus 120 are separated by physical distance. Each one of these signal paths and/or physical media (at times referred to below as "wires") may be capable of transmitting one or more bits of information at a time. The signals transported on the bus 120 may be subjected to noise which causes degradation or corruption of said signals. Among the many sources of noise, we mention four types: (a) the common-mode noise which is noise and interference that is common to the wires in the signal path; where the signal path is located on a chip and has the task of transmitting information from one part of the chip (for example memory) to another part (for example the CPU) such noise could be caused by the power-supply, crosstalk, electromagnetic interference (EMI), or other types of interference; (b) Independent noise, which corrupts the signals of each wire independently; (c) Simultaneous switching output (SSO) noise which appears when the total power consumption of the circuits in the signal path is not constant, thus leading to additional noise corrupting the signals on the wires; and (d) Reference noise, which appears when the base references with respect to which the signals are defined are not the same at the point of origin and the point of acquisition of the signals; one of the many scenarios in which such noise is encountered is when the signals transmitted on the wires are voltages measured with respect to a reference at the point of origin of the signals, and need to be measured with respect to the same reference at the point of acquisition. Where the signal paths are long, for example, or where the points of origin and acquisition of the signals are in two different environments, the reference noise can be quite substantial. Furthermore, component tolerances are also a common cause of difference of references at both ends of the signal bus.

Another property of the bus 120 is that of the pin-efficiency. For the purposes of this disclosure, the pin-efficiency of the signal path is defined as the ratio between the number of wires in the signal path, and the number of signals that are simultaneously transmitted. All other aspects being equal, a system that supports a higher pin-efficiency is typically preferred over one with a lower pin-efficiency. Once the signal is transmitted by the bus 120, it may enter a detransformer 130. The task of the detransformer 130 includes reconstructing the original information in the information storage medium 101 and/or the signal representing this information. For example, when the information from the information storage medium 101 is represented by an NRZ signal, the output of the detransformer 130 may be an NRZ signal. In at least one embodiment of the invention, the communication devices 102, 104 containing the transformer 110 and the detransformer 130 are physically coupled to the bus 120 by physical bus interfaces 106, 108, respectively. Examples of the physical bus interfaces 106, 108 include pins of a computer chip, optical fiber interfaces, and copper wire interfaces in accordance with any suitable communication standard. Once the signals leave the detransformer 130, they may be transported to one or more further units in the communication path for further processing. Such further units could include another bus, or they could include any other part of the communication path in need of the information (for example a memory unit which stores the information digitally or a DSL modem that will process the signal). The example devices 102, 104 may be components of larger devices not shown in FIG. 1. For descriptive clarity, arrows between some components 101, 110, 120, 130 in FIG. 1 show information and/or signals being transmitted in one direction. However, each embodiment of the invention is not so limited. For example, communication between the devices 102, 104 may be bidirectional.

Figure 2:
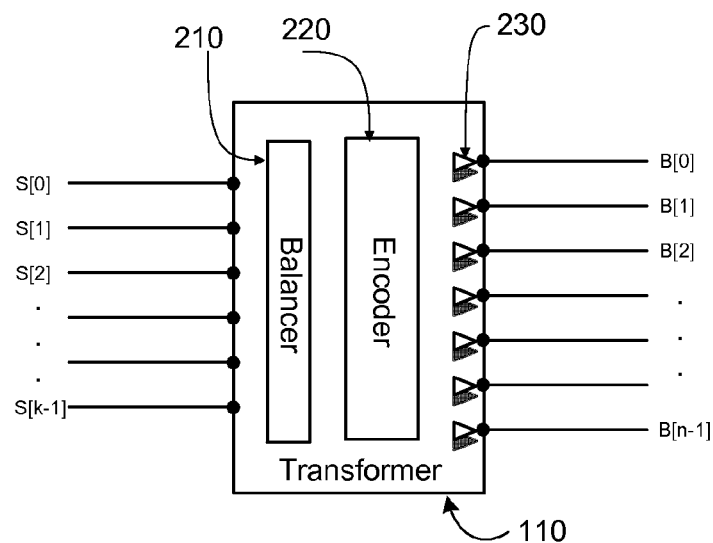
FIG. 2 is a schematic diagram depicting aspects of an example transformer in accordance with at least one embodiment of the invention.

The operation of the example transformer 110 is further described with reference to FIG. 2. In this figure a number, k, of signals denoted S[0], . . . , S[k−1] enter the transformer. These signals are a representation of the information in the information storage medium 101 (FIG. 1). The transformer may include three units: the balancer 210, the encoder 220, and the drivers 230. Signals S[0], . . . , S[k−1] may enter the balancer 210 first. A task of the balancer 210 is to convert the information in the information storage medium 101, or the signal representing this information, to a form that can be handled by the encoder 220. For example, for an NRZ signal, the signal levels can be adjusted before entering the encoder 220. If the signals entering the balancer 210 correspond to bits, then they are mapped to real numbers. A logical 0 can for example be represented by a 1 and a logical 1 by a −1. These signals are then forwarded to the encoder. The encoder produces from the output of the balancer n signals. These signals can then be passed to a signal path driver 230 which can amplify the signal and apply additional filtering. Furthermore, the signal path drivers transmit the signal denoted B[0], . . . , B[n−1] on bus 120. When the medium does not carry electrical signals, the signal driver can also include a transducer transforming the signals to another physical quantity, for example light. In a system employing a transformer with these parameters, the pin-efficiency is equal to k/n, since k bits are being transmitted with the help of n waveforms on the bus 120.

Figure 3:
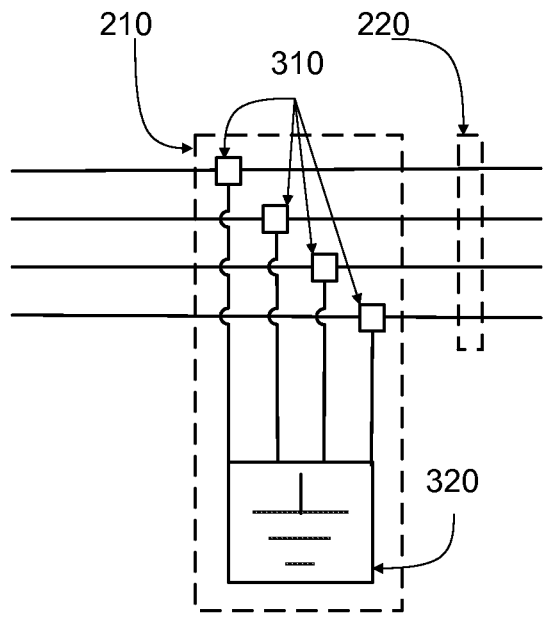
FIG. 3 is a schematic diagram depicting aspects of example components facilitating single-ended signaling.

FIG. 3 depicts aspects of example components facilitating single-ended signaling. Units 310 may be understood as performing a balancing function corresponding to the balancer 210 (FIG. 2). These units 310 create for every incoming signal another signal that can differ with respect to the reference 320. Where these signals correspond to voltages, these units put on their outgoing wires one of two possible voltages wherein these voltages depend on the reference 320. For example, these units could put a voltage of V or V+a on these wires where V is the voltage of the reference point and a is a predetermined voltage. These voltages are then forwarded directly to the bus 120, so that no components corresponding to the encoder 220 are necessary in this case. The pin-efficiency of single-ended signaling is 1.0 or 100%. However, single-ended signaling suffers from a plurality of noise types, as described earlier. A common approach to alleviate these problems is to increase the value of a thereby increasing the total energy consumption. However, in applications this may lead to other disadvantageous effects (such as battery drain, or induction of noise on other devices).

Figure 4:
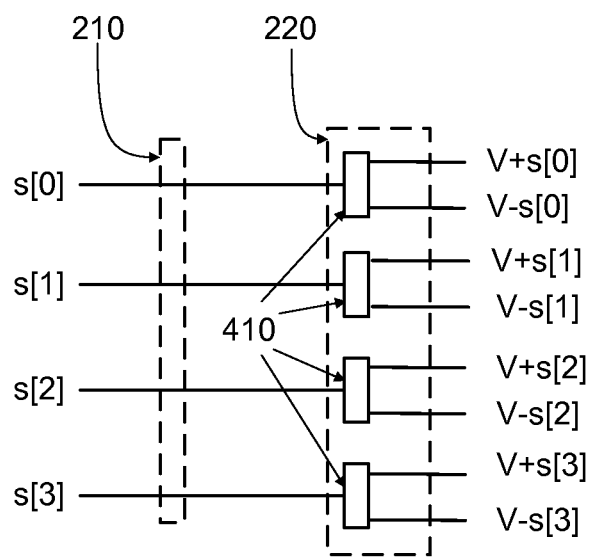
FIG. 4 is a schematic diagram depicting aspects of example components facilitating conventional differential signaling.

FIG. 4 depicts aspects of example components facilitating conventional differential signaling. In this example, the input signals are designated S[0], . . . , s[3]. No components corresponding to the balancer 210 (FIG. 2) are necessary in this example. Units 410 feeds two wires for each incoming signal S[0], . . . , s[3]. The amplitude of the signal put on the first wire is V+s[i] and that of the signal put on the second wire V−s[i] for i=0, 1, . . . , 3. The amplitude of the signals is chosen so that the difference in amplitude between the first and second wire is 2s[i]. The value of V is typically unimportant, and can be chosen to be 0, since the information is encoded by the difference of the amplitudes of the signals put on the two wires. Units 410 may be understood as performing an encoding function corresponding to the encoder 220.

Differential signaling is resistant to some of the noise scenarios discussed above: it is resistant to common mode noise since the information is encoded as the difference of voltages of two wires. Differential signaling provides a better resistance to bus noise than single-ended signaling. One of the reasons is that the swing in amplitude is twice as large as in single-ended signaling. As will be apparent to one of skill in the art, in single-ended signaling some transmission power may be wasted in a DC value of the transmitted signal. Differential signaling does not introduce SSO noise in case of chip-to-chip communication of NRZ-like signals. Finally, it is also resistant to reference noise because no external reference is required to reconstruct the original signals. However, differential signaling has that disadvantage that its pin-efficiency is 0.5 or 50%.

Figure 5:
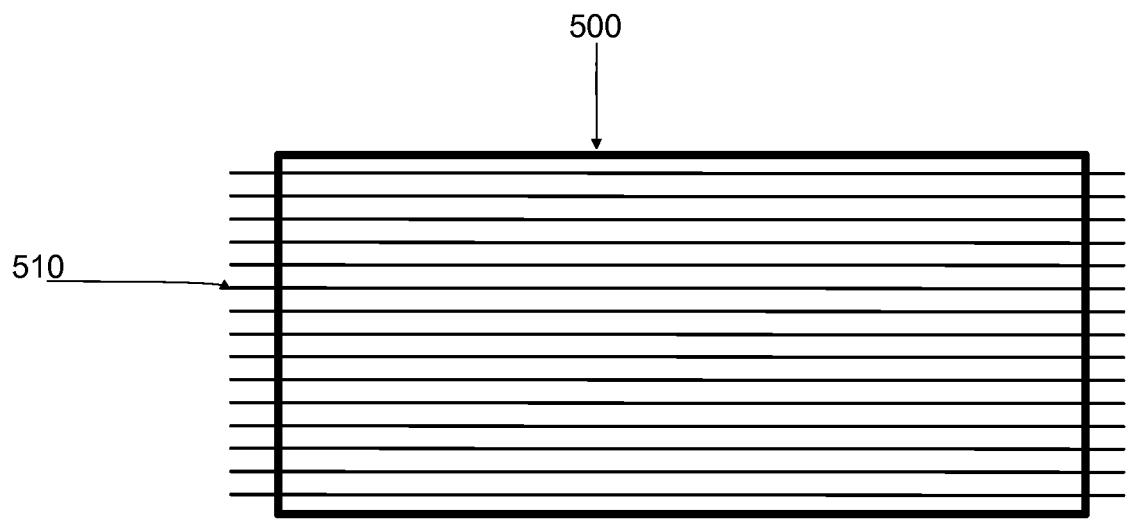
FIG. 5 is a schematic diagram depicting aspects of an example communication bus in accordance with at least one embodiment of the invention.

FIG. 5 depicts aspects of an example communication bus 500 in accordance with at least one embodiment of the invention. The communication bus 500 is an example of the bus 120 (FIG. 1). The bus 500 includes a plurality of signal paths such as the signal path 510. Each signal path may include transmission media such as wires (e.g., metallic wires) on which information is transmitted in the form of electrical voltages or currents. In chip-to-chip communications these wires may be on-chip interconnects, PCB traces or strip lines. Yet another application is DSL communications where each bus wire may correspond to one wire of a twisted pair copper line typically used in DSL communications. A similar application is unshielded twisted pair (UTP) Ethernet communications where again a wire of the bus 500 may correspond to one of the wires in a twisted pair. For communication between devices such as camera's, laptops, TVs, etc, the bus 500 may be in accordance with any suitable conventional communication standard and/or specification. In other embodiments, the signal paths can be optical cables transmitting optical signals in form of light. In yet other embodiments, the signal paths can be media suited to the transmission of signals.

In at least one embodiment of the invention, each signal is physical, tangible and/or non-transitory in time. In at least one embodiment of the invention, a physical signal is a signal that is tangibly embodied in a tangible and/or physical transmission media. In at least one embodiment of the invention, transformation of signals includes physical transformation of physical signals as part of a physical mechanism. In at least one embodiment of the invention, signals are tangible aspects of an apparatus. In at least one embodiment of the invention, signals are transformed by a mechanism in accordance with physical principles well known to those of skill in the art.

Example of Orthogonal Differential Vector Signaling

Figure 6:
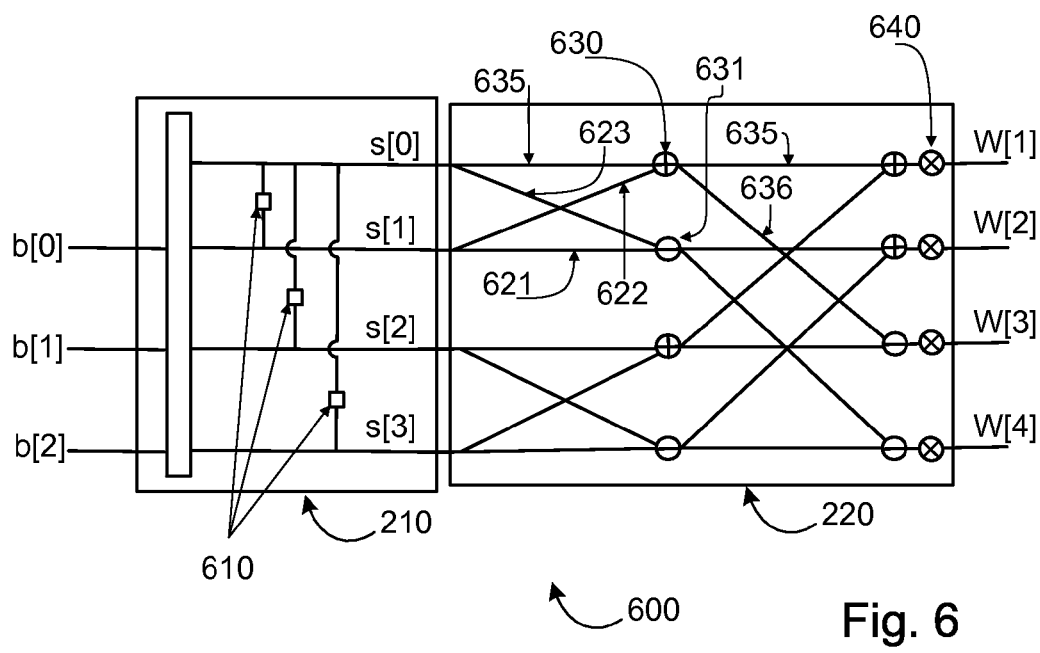
FIG. 6 is a schematic diagram depicting aspects of an example transformer in accordance with at least one embodiment of the invention.

The description now turns to an example of orthogonal differential vector signaling with reference to FIG. 6. FIG. 6 depicts aspects of an example transformer 600 in accordance with at least one embodiment of the invention. The transformer 600 has a pin-efficiency of 0.75 or 75%, and has input including three signals b[0], b[1] and b[2]. These signals represent the information in the information storage medium 101. The balancer 210 creates four signals S[0], s[1], s[2] and s[3] from the incoming three signals b[0], b[1] and b[2]. The first signal s[0] is set to V and the other signals s[1], s[2] and s[3] are set with respect to this first signal s[0]. This task is done by the units 610 which set s[i] to b[i−1]−V for i=1, 2, 3. Depending on the application V can be set to 0 or some other suitable value. In chip-to-chip communication b[0], b[1] and b[2] may be single-ended NRZ signals with associated signal levels of a and 0. In this case V may be set to a/2 to remove the mean value of the single-ended NRZ signal. The four generated signals s[0], s[1], s[2] and s[3] may then enter the encoder 220. The encoder 220 may include various components such as adders such as adder 630, subtractors such as subtractor 631, multipliers such as multiplier 640, and paths connecting these components such as paths 621, 622, 623, 635 and 636. In at least one embodiment, the multipliers are incorporated into the drivers 230. A task of the adders is to add incoming values and pass them on the outgoing paths. A task of the subtractors is to subtract the lower incoming value from the upper one and pass it on the outgoing paths. A task of the multipliers is to multiply the incoming value by a suitable factor (e.g., 0.5 in this case) and to pass it along the outgoing path. For example, the adder 630 computes the addition of the values of its incoming paths 635 and 622 which is s[0]+s[1] and passes it on the paths 635 and 636. Similarly, the subtractor 631 subtracts the value of its lower incoming path 621, namely s[1], from the value of its upper incoming path, namely S[0], and passes on the result s[0]−s[1] along its outgoing paths. The output of the encoder 220 is four values W[1], . . . , W[4].

For example, if s[0]=0, the output of the encoder 220 has the following relationship to the encoder input:

$$W[1]=(s[1]+s[2]+s[3])/2$$

$$W[2]=(-s[1]+s[2]-s[3])/2$$

$$W[3]=(s[1]-s[2]-s[3])/2$$

$$W[4]=(-s[1]-s[2]+s[3])/2$$

The total energy of these values, defined as the square root of the sum of the squares of these numbers, is the same as the total energy of the original values 0, s[1], s[2], s[3], namely the square root of $s[1]^2+s[2]^2+s[3]^2$. In chip-to-chip communications where signals s[1], s[2] and s[3] are balanced NRZ signals, this means that the new signals W[1], . . . , W[4] sent on the bus 120 may reduce SSO noise. In addition, as will be seen below, in at least one embodiment of the invention, these signals W[1], . . . , W[4] are resistant to common mode noise, moderate amounts of independent noise, as well as reference noise.

The Detransformer

Figure 7:
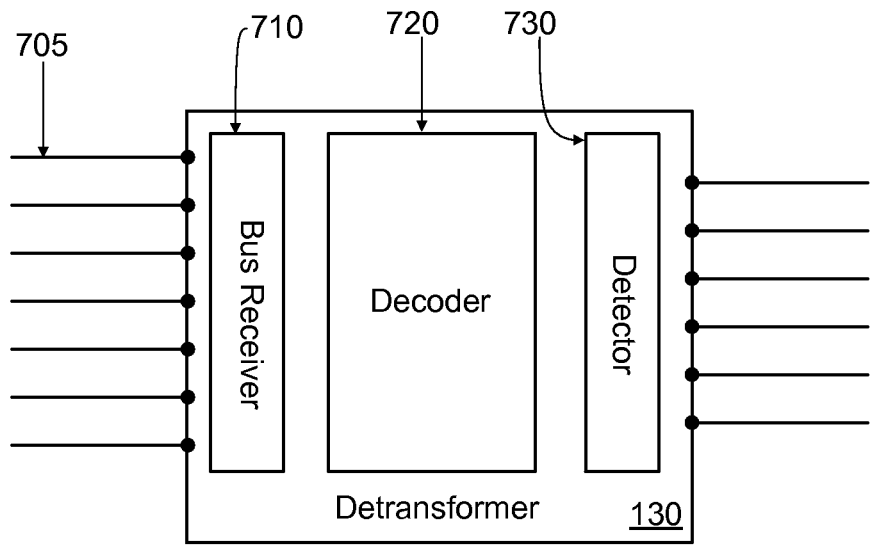
FIG. 7 is a schematic diagram depicting aspects of an example detransformer in accordance with at least one embodiment of the invention.

Aspects of an example detransformer 130 (FIG. 1) in accordance with at least one embodiment of the invention are depicted in FIG. 7. The example detransformer 130 includes a bus receiver 710, a decoder 720 and a detector 730. The signals 705 coming from the bus 130 enter the detransformer through bus receiver 710. The bus receiver 710 measures the relevant quantities at the bus. If required for the actual measurement, the bus receiver 710 could perform amplification and filtering also. The bus receiver 710 sends signals to the decoder 720. The decoder performs the inverse tasks of the encoder 220, as described in more detail below.

A task of the detector 730 is to reproduce the original information stored in the information storage medium 101 (FIG. 1) from the signals obtained from the decoder 720. The signals delivered by the decoder 720 can be corrupted by several sources of noise. The amount of noise that is tolerable by the detector depends on the applications, on the environment, and on the energy spent on the signals, and on the resources of the detector 720. Typically, but not necessarily, the noise on the incoming signals may be modeled by a Gaussian variable of a given variance, wherein bigger variances correspond to a larger amount of noise, and smaller variances correspond to smaller amounts of noise. Based on assumptions on the noise, the detector 720 may attempt to reconstruct the original information in 101 or a physical representation of this information. One of skill in the art will recognize that several detection techniques known from communication theory can be applied. Furthermore, it is possible to change the order of and/or to integrate decoding and detection. Depending on the exact implementation of the detector 730 this may result in a performance degradation (or not).

Figure 8:
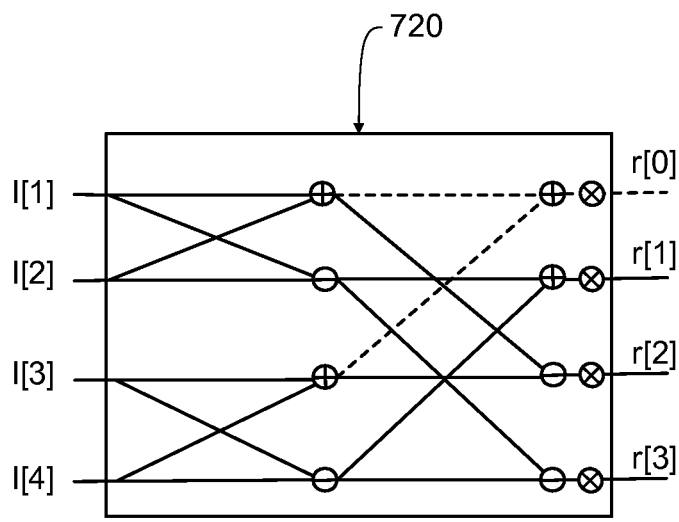
FIG. 8 is a schematic diagram depicting aspects of an example decoder in accordance with at least one embodiment of the invention.

FIG. 8 depicts aspects of an example decoder 720 suitable for decoding signals generated by the encoder 220 (FIG. 2) as described above with reference to FIG. 6, in which three signals b[0], b[1] and b[2] were encoded in accordance with at least one embodiment of the invention for transmission over four wires. The decoder 720 corresponds to the encoder 220 of FIG. 6. Differences between the encoder 220 and decoder 720 include that the first output of this unit may be discarded in the decoder 720. This is the case if the first input s[0] of encoder 220 in FIG. 6 was set to 0. The input to the decoder 720 includes the signals I[1], . . . , I[4], and the output includes the signals r[1], r[2], r[3] corresponding to signals s[1], s[2], s[3] input to the encoder 220 of FIG. 6. The dashed signal paths in FIG. 8 indicate that these signal paths may be discarded in an at least one embodiment of the invention, though this need not be the case. In at least one embodiment of the invention, it may be an advantage that, for example, where the cost of manufacturing different encoding and decoding units is a factor, a user may choose to use as the decoder 720 a same and/or similar hardware unit as for the encoder 220. The first output r[0] of the decoder unit 720 may also be utilized as a noise sensor. This can be used in a feedback loop to cancel the common-node noise from the wires even before entering the bus receiver 710. Other options also exist. For example, instead of transmitting a 0 on the first wire of the bus, it is possible to transmit a clock signal that can be used for synchronization. Even though this clock would be highly disturbed by noise, it could still be used to synchronize.

Matrix Interpretation of the Encoder and the Decoder

The operations of the encoder 220 and the decoder 720 according to the present invention can be succinctly described in terms of a class of matrices known to those of skill in the art as Hadamard matrices. A Hadamard matrix of size n is a square matrix of size n which contains as entries either +1 or −1, and for which any two different rows are orthogonal. A square matrix in which different rows are orthonormal is known as an orthogonal matrix in the literature. Therefore, a Hadamard matrix with normalized rows and columns is an orthogonal matrix. In what follows, the term "Hadamard matrix" may be read as "Hadamard matrix with normalized rows and/or columns" unless clearly contradicted by context.

A simple Hadamard matrix of size 2 is the matrix $$H_2 = \frac{1}{\sqrt{2}}\begin{pmatrix} 1 & 1 \\ 1 & -1 \end{pmatrix}.$$

A special recursive construction of a Hadamard matrix $H_{2^n}$ of size $2^n$ is furnished by the Sylvester construction:

$$H_{2^n} = \frac{1}{\sqrt{2}}\begin{pmatrix} H_{2^{n-1}} & H_{2^{n-1}} \\ H_{2^{n-1}} & -H_{2^{n-1}} \end{pmatrix}.$$

Figure 9:
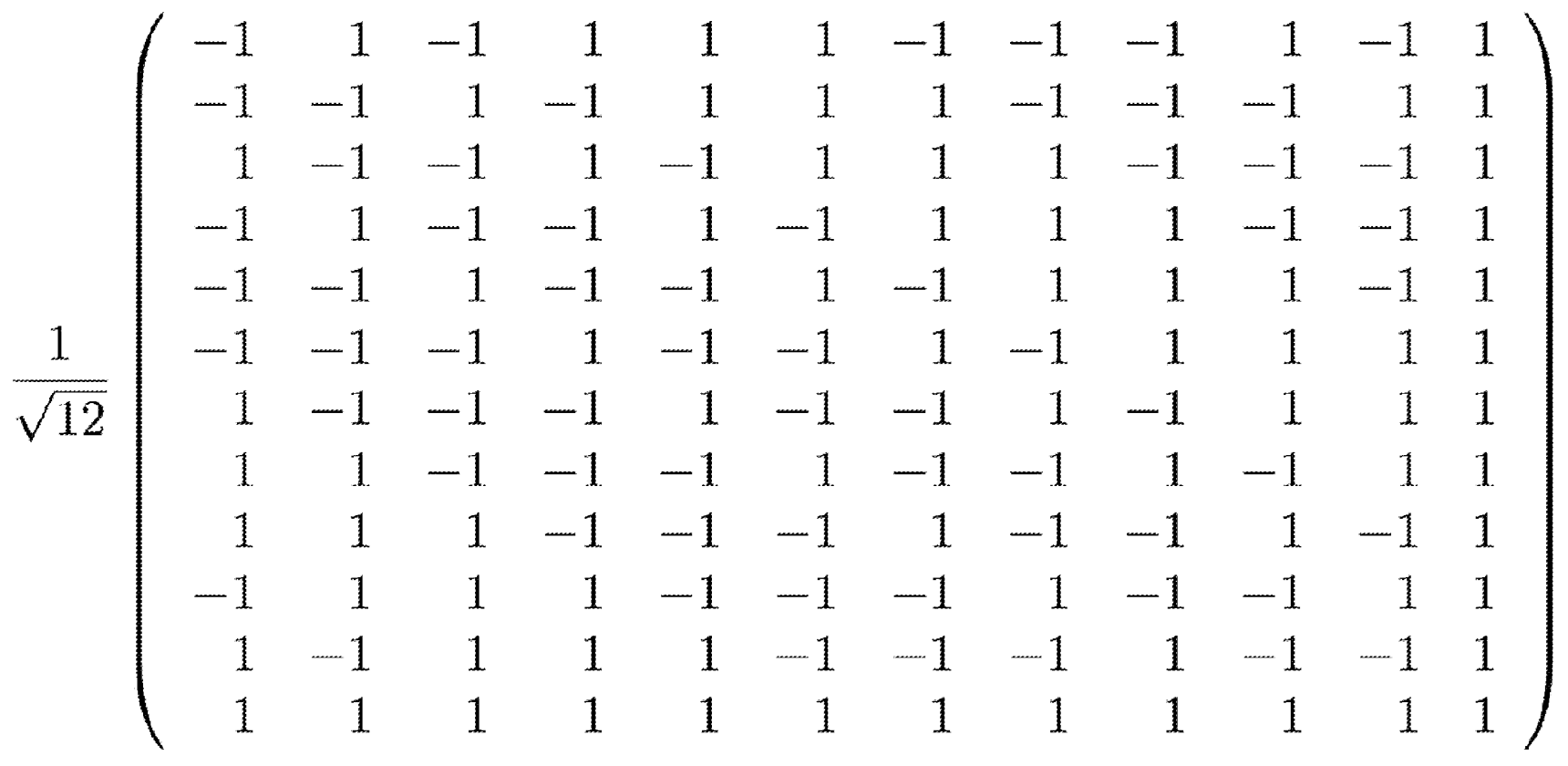

Other constructions of Hadamard matrices are also known to specialists in the field as long as the size of the matrix is divisible by 4. For example, a Hadamard matrix of size 12 is given in FIG. 9.

Properties of Hadamard matrices include orthogonality and the fact that the multiplication of the matrix with a vector in which all components are equal produces a vector which has a nonzero entry in only one of its coordinate positions. As far as efficient implementation is concerned, a third property that is useful for the implementation of methods in accordance with at least one embodiment of the invention is efficiency of the multiplication of the matrix with a given vector. Hadamard matrices of Sylvester type ("Sylvester Hadamard matrices") satisfy these three requirements and therefore are particularly well suited for implementing the methods in accordance with at least one embodiment of the invention. Moreover, Sylvester Hadamard matrices are symmetric, which means that they are identical to their inverses. As will be apparent to one of skill in the art, this fact has further positive implications for hardware realizations of methods in accordance with at least one embodiment of the invention.

The operation of the example encoder 220 is now succinctly described in terms of matrices. The signals leaving the balancer 210 and entering the encoder 220 are for the purposes of this presentation denoted by s[1], . . . , s[k] and H is a Hadamard matrix of size k+1. The signals leaving encoder 220 are then the values v[0], . . . , v[k] wherein $$\begin{pmatrix} v[0] \\ v[1] \\ \vdots \\ v[k-1] \\ v[k] \end{pmatrix} = H \begin{pmatrix} 0 \\ s[1] \\ \vdots \\ s[k-1] \\ s[k] \end{pmatrix}.$$

Decoder 720 performs the inverse operation. If the signals leaving the bus receiver 710 are denoted I[0], . . . , I[k], then the operation of decoder 720 corresponds to the multiplication $$\begin{pmatrix} r[0] \\ r[1] \\ \vdots \\ r[k-1] \\ r[k] \end{pmatrix} = H^{-1} \begin{pmatrix} I[0] \\ I[1] \\ \vdots \\ I[k-1] \\ I[k] \end{pmatrix}.$$

wherein r[1], . . . , r[k] are the signals that leave decoder 720. The value of r[0] may be chosen to be "irrelevant", that is, not directly corresponding to one of the signals s[1], . . . , s[k]. It should be noted that the first value r[0] is chosen to be irrelevant only for illustrative purposes. Which of the values r[i] is irrelevant depends on the Hadamard matrix chosen. For example, for the Hadamard matrix of order 12 depicted in FIG. 9, the last entry r[k] would be irrelevant. In general, where H is a Hadamard matrix in which the row with index j consists entirely of ones, the corresponding entry r[j] would be irrelevant.

The act of signaling corresponding to the multiplication by a Hadamard matrix as described above is named Hadamard differential vector signaling (a special case of orthogonal differential vector signaling, as described in more detail below).

Sylvester type Hadamard matrices are particularly useful for Hadamard differential vector signaling. For example, such matrices are self-inverse, i.e., they are identical to their inverse. This means that the encoder 220 and the decoder 720 can be substantially identical. This can be advantageous since no additional development costs are necessary for the decoder 720.

Figure 10:
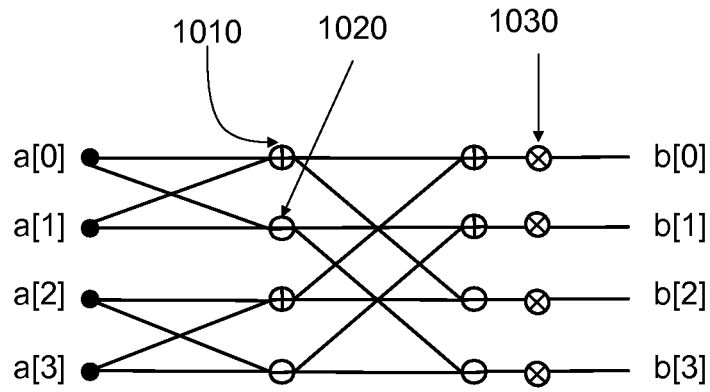
FIG. 10 is a schematic diagram depicting aspects of an example encoder and/or decoder circuit in accordance with at least one embodiment of the invention.

Another reason for use of Sylvester type Hadamard matrices is a very efficient procedure for multiplying such matrices with a vector known as the Fast Hadamard-Walsh Transform. An example of such a transform is given with reference to FIGS. 10 and 11a for the Sylvester type Hadamard matrices of sizes 4 and 8, respectively. In FIG. 10 the circuit 1000 corresponding to $H_4$ (the Sylvester Hadamard matrix of size 4) includes adders such as the adder 1010, subtractors such as the subtractor 1020, and multipliers such as the multiplier 1030. As described above for the encoder 220 with reference to FIG. 6, a task of the adder 1010 is to add the values of its incoming signals and pass them on the outgoing signal paths. Similarly, a task of the subtractor 1020 is to subtract the value of the lower incoming signal from that of the upper incoming signal and pass it along its outgoing paths. The multiplier 1030 has a task of multiplying the incoming signal by a factor (e.g., 0.5 in this case) and passing it along its outgoing path.

The mathematical relationship between the incoming signals a[0], . . . , a[3] and the outgoing signals b[0], . . . , b[3] can be described by the identity $$\begin{pmatrix} b[0] \\ b[1] \\ b[2] \\ b[3] \end{pmatrix} = H_4 \begin{pmatrix} a[0] \\ a[1] \\ a[2] \\ a[3] \end{pmatrix}.$$

Figure 11A:
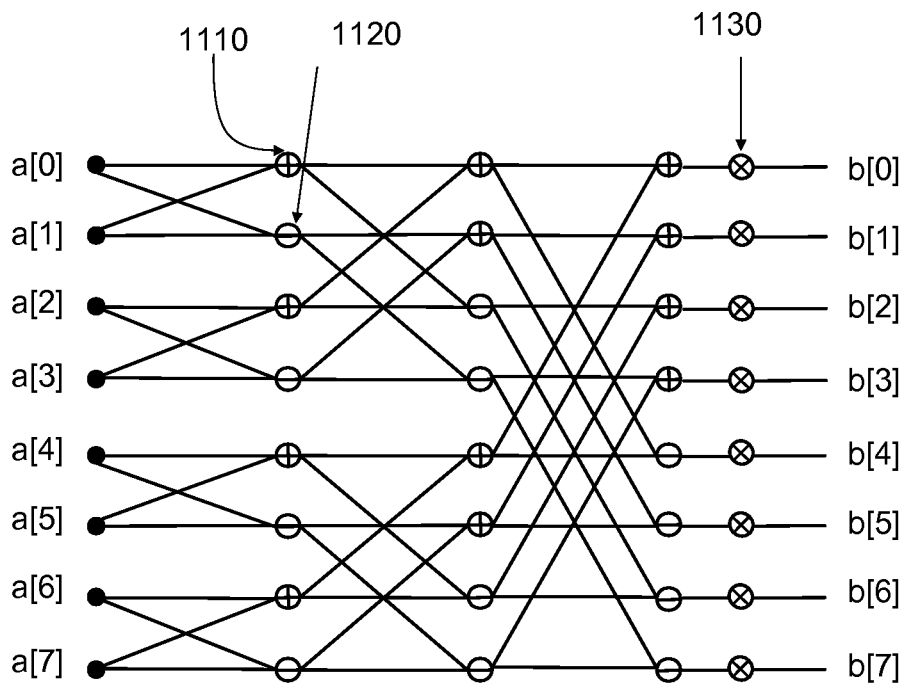
FIG. 11a is a schematic diagram depicting aspects of another example encoder and/or decoder in accordance with at least one embodiment of the invention.

Similarly, the adders such as the adder 1110 and subtractors such as the subtractor 1120 in FIG. 11a perform the same task as their corresponding counterparts in FIG. 10. However, multipliers such as the multiplier 1130 perform a slightly different task: they multiply the incoming signal by a factor of $1/\sqrt{8}$. As can be seen, the relationship between the incoming signals a[0], . . . , a[7] and the outgoing signals b[0], . . . , b[7] is given by the identity $$\begin{pmatrix} b[0] \\ b[1] \\ \vdots \\ b[6] \\ b[7] \end{pmatrix} = H_8 \begin{pmatrix} a[0] \\ a[1] \\ \vdots \\ a[6] \\ a[7] \end{pmatrix}.$$

The operations described in FIGS. 10 and 11a can be generalized for Sylvester type Hadamard matrices of size $2^n$ for any n, as will be apparent to those of skill in the art. Such operations may be understood as corresponding to a Fast Hadamard-Walsh Transformation (FHWT).

In applications where the implementation of a subtractor unit, such as subtractors 1020 and 1120, is costly or otherwise undesirable, the computation of a Hadamard-Walsh Transformation can be changed in such a way as to substantially reduce the number of subtractors. The method is based on binary versions of Hadamard matrices. If $1_n$ denotes the n×n-matrix in which all entries are equal to the number 1, and if H denotes an n×n-Hadamard matrix, then the binary version of H is the matrix $$T = \frac{1}{2}(H + 1_n)$$

If a procedure calculates for a given vector x the product Tx, then the method can be used to also calculate the product Hx, since $$H \cdot x = 2 \cdot T \cdot x - 1_n \cdot x$$

The entries of the vector $1_n \cdot x$ are all equal to the sum of the entries of the vector x. For Sylvester type Hadamard matrices the corresponding binary matrix has the advantage that its product with a vector can be calculated efficiently without using any subtractors. The method is exemplified with reference to FIG. 11b-11f. The circuit 1132 in FIG. 11b computes the Hadamard-Walsh Transformation of the vector (a[0], a[1], a[2], a[3]) which is equal to the vector (b[0],b[1],b[2],b[3]). It uses forwarder units such as the forwarder unit 1135, special subtractor units such as the special subtractor 1140, adders 1138, and multiplier units such as the multiplier 1145. The operation of the forwarder 1135 is explained with reference to FIG. 11c. A task of the forwarder 1135 is to forward the incoming value x along each of its one or more outgoing paths. A task of the special subtractor 1140 is described with reference to FIG. 11*d*. The task is to form the value 2y−x for incoming values x and y.

Figure 11B:
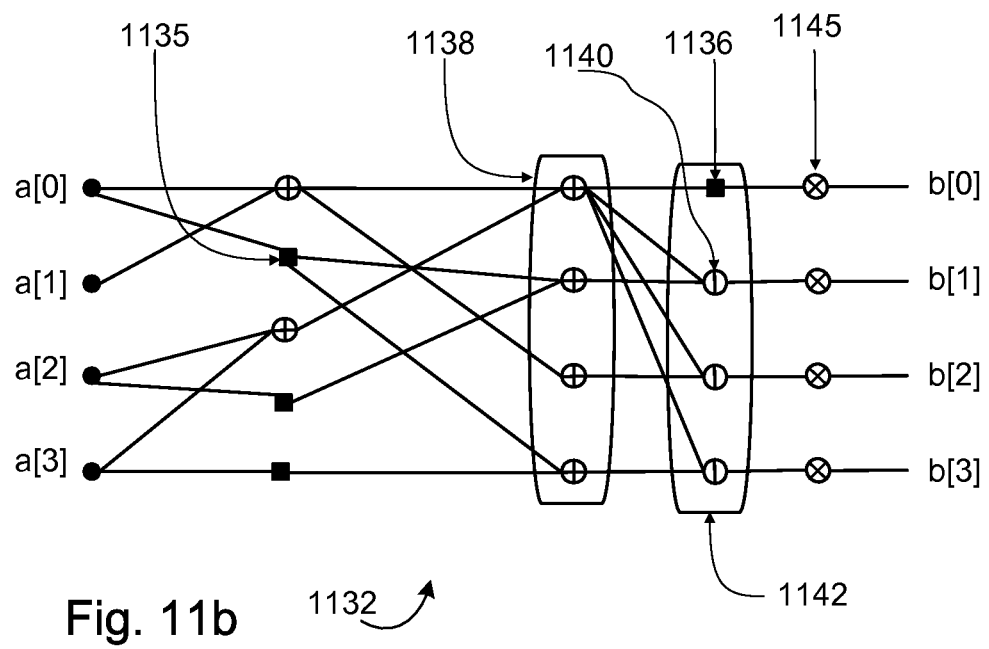
FIG. 11b is a schematic diagram depicting aspects of yet another example encoder and/or decoder in accordance with at least one embodiment of the invention.
Figure 11C:
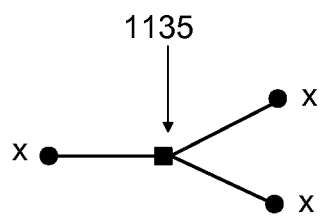
FIG. 11c is a schematic diagram depicting aspects of an example forwarder in accordance with at least one embodiment of the invention.
Figure 11D:
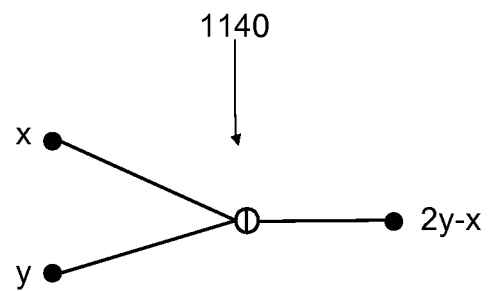
FIG. 11d is a schematic diagram depicting aspects of an example special subtractor in accordance with at least one embodiment of the invention.

Coming back to FIG. 11*b*, it can be seen that the output of the gates in the layer denoted 1138 is equal to the vector (a[0]+a[1]+a[2]+a[3], a[0]+a[2], a[0]+a[1], a[0]+a[3]). In other words, it is equal to the product $$\begin{pmatrix} c[0] \\ c[1] \\ c[2] \\ c[3] \end{pmatrix} = \begin{pmatrix} 1 & 1 & 1 & 1 \\ 1 & 0 & 1 & 0 \\ 1 & 1 & 0 & 0 \\ 1 & 0 & 0 & 1 \end{pmatrix} \cdot \begin{pmatrix} a[0] \\ a[1] \\ a[2] \\ a[3] \end{pmatrix}$$

The matrix in this multiplication is the binary version of $2 \cdot H_4$. The signals calculated in this layer are processed in the next layer as follows: the forwarder 1136 forwards the value of the first gate, i.e., c[0], and the subtractors in the layer 1142 such as subtractor 1140 calculate the values 2c[1]−c[0], 2c[2]−c[0], 2c[3]−c[0]. Therefore, the value of the output gates in layer 1142 equals (2c[0]−c[0], 2c[1]−c[0], 2c[2]−c[0], 2c[3]−c[0]), which can be seen to be equal to $$2 \cdot H_4 \cdot \begin{pmatrix} a[0] \\ a[1] \\ a[2] \\ a[3] \end{pmatrix}$$

The task of the final multipliers is to multiply the incoming signals by 0.5.

Figure 11E:
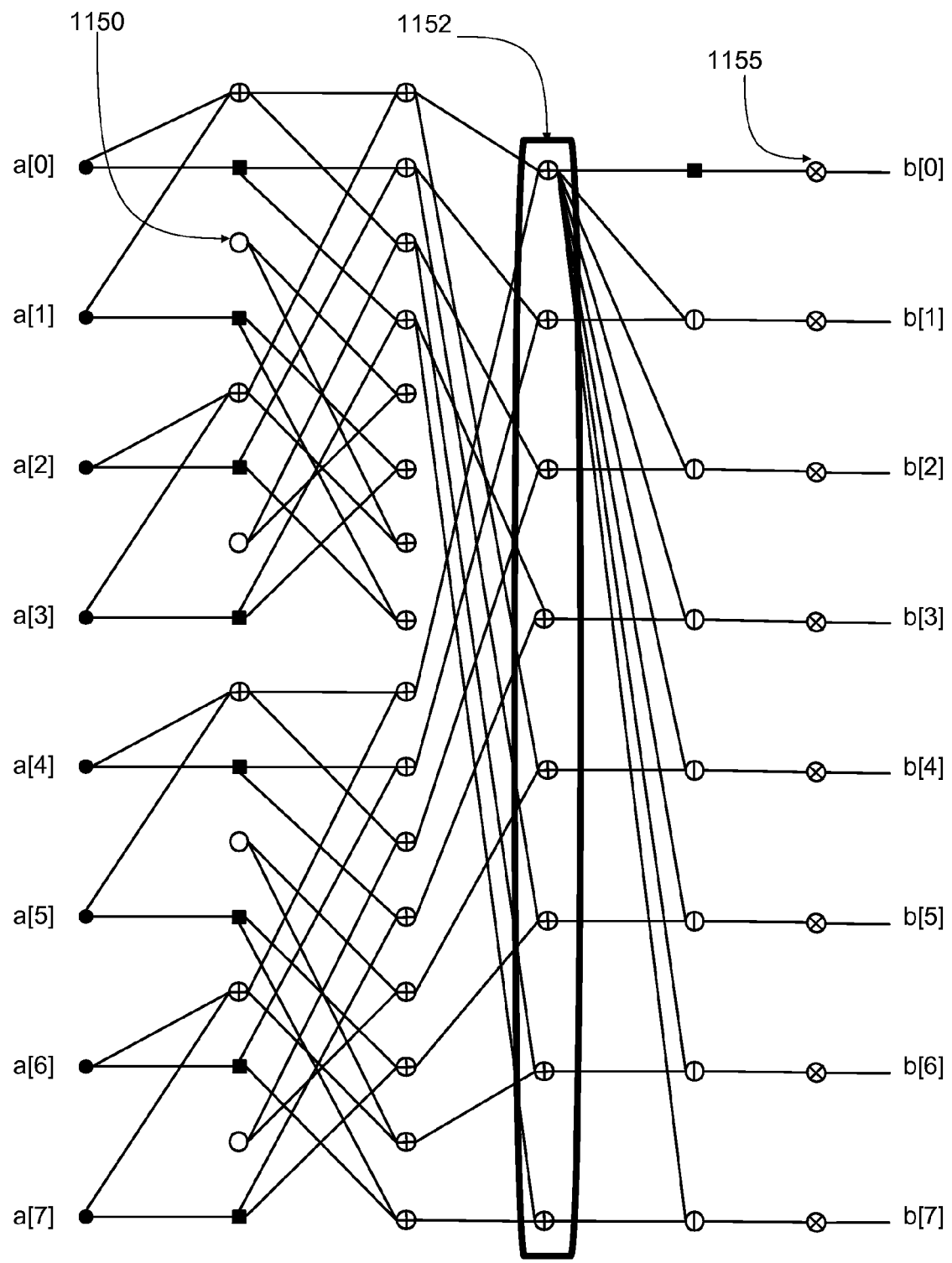
FIG. 11e is a schematic diagram depicting aspects of still another example encoder and/or decoder in accordance with at least one embodiment of the invention.
Figure 11F:
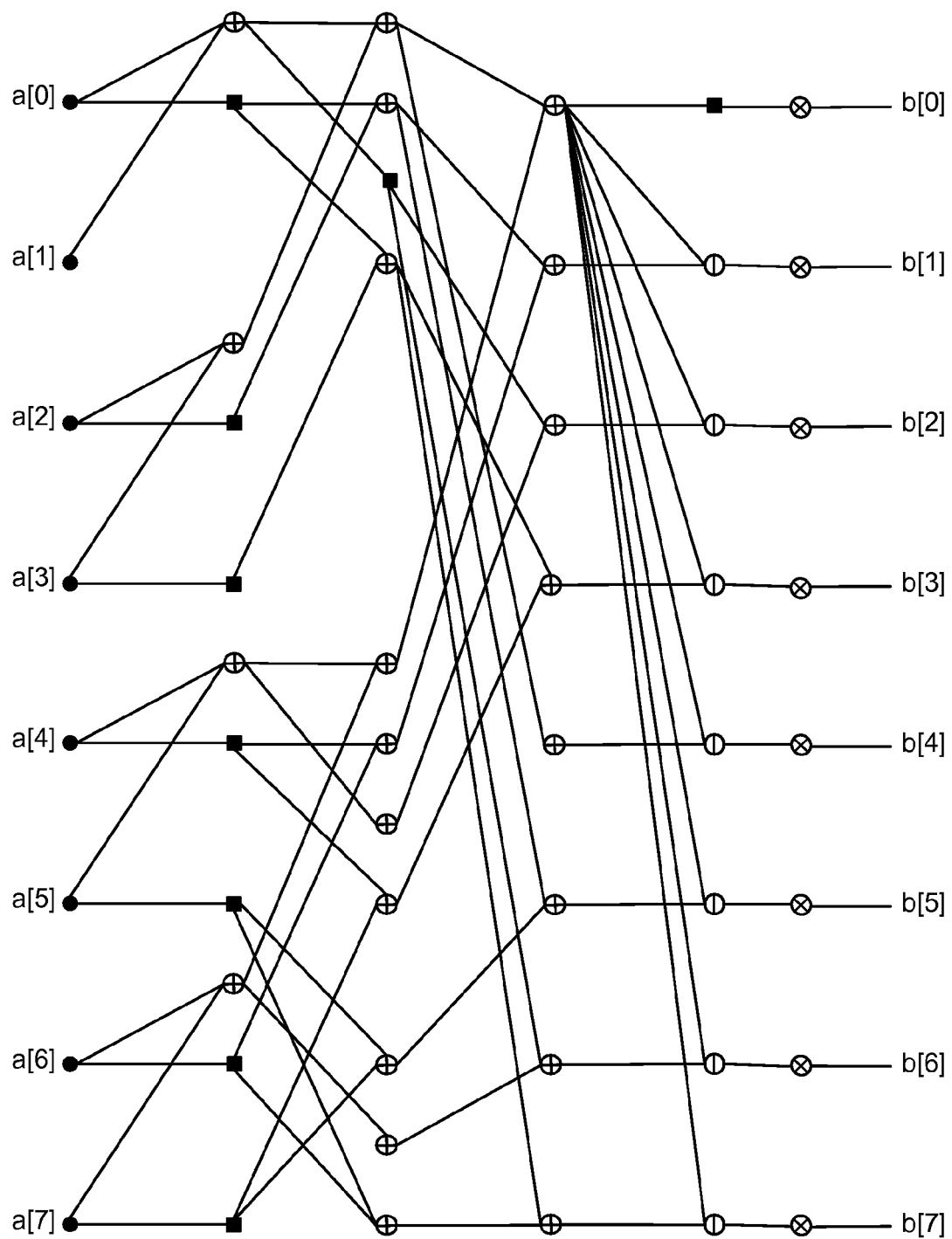
FIG. 11f is a schematic diagram depicting aspects of a further example encoder and/or decoder in accordance with at least one embodiment of the invention.

Another example of the calculation of a FHWT of a vector of length 8 is furnished by FIG. 11*e* and 11*f*. In addition to forwarders and subtractors, the example in FIG. 11*e* uses null gates such as the null gate 1150. The task of the null gates is to forward a null value (e.g., 0) along all outgoing paths. The value of the gates in layer 1152 is equal to the product $$\sqrt{8} \cdot T_8 \cdot \begin{pmatrix} a[0] \\ a[1] \\ \vdots \\ a[7] \end{pmatrix}$$

wherein $T_8$ is the binary version of the Hadamard matrix $H_8$. The task of the multipliers such as the multiplier 1155 is to multiply the incoming values by the quantity $1/\sqrt{8}$. The values (b[0], . . . , b[7]) satisfy the relation $$\begin{pmatrix} b[0] \\ b[1] \\ \vdots \\ b[6] \\ b[7] \end{pmatrix} = H_8 \begin{pmatrix} a[0] \\ a[1] \\ \vdots \\ a[6] \\ a[7] \end{pmatrix}$$

The operation of the circuit 1160 in FIG. 11*e* is further simplified with reference to FIG. 11*f*. The basic difference between these two versions is that the circuit 1170 in FIG. 11*f* does not contain any null gates, and is obtained from the circuit 1160 in FIG. 11*e* by removing the null gates and all communication paths emanating from them.

In general, if $T_{2^n}$ denotes the binary version of the Hadamard matrix $H_{2^n}$, and if $U_{2^n}$ denotes the matrix in which all entries of $T_{2^n}$ are inverted (0 is inverted to a 1, and 1 is inverted to a 0), then we have the recursion $$T_{2^{n+1}} = \frac{1}{\sqrt{2}} \begin{pmatrix} T_{2^n} & T_{2^n} \\ T_{2^n} & U_{2^n} \end{pmatrix}, U_{2^{n+1}} = \frac{1}{\sqrt{2}} \begin{pmatrix} U_{2^n} & U_{2^n} \\ U_{2^n} & T_{2^n} \end{pmatrix}$$

These two recursions can be used to efficiently compute $T_{2^n} x$ for any vector x. The examples in FIG. 11*b*, 11*e*, 11*f* may be determined based on these recursions.

General Operation of Orthogonal Differential Vector Signaling

Figure 12A:
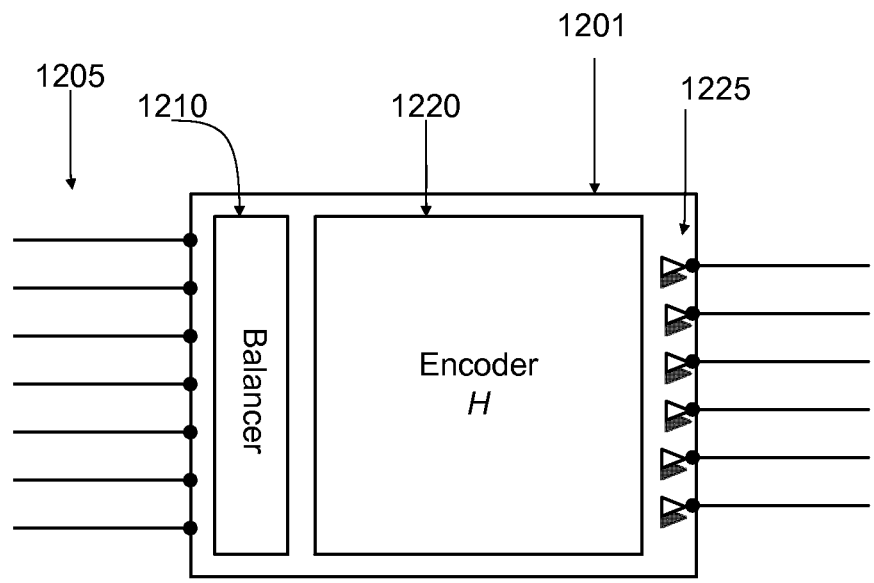
FIG. 12a is a schematic diagram depicting aspects of another example transformer in accordance with at least one embodiment of the invention.

An example transformer 1201 and an example detransformer 1260 in accordance with at least one embodiment of the invention are now described with reference to FIG. 12*a* and FIG. 12*b*. The transformer 1201 in FIG. 12*a* makes use of a Hadamard matrix H of size n. The input 1205 of the transformer includes n−1 of signals which enter the balancer 1210. The output of the balancer 1210 includes n signals which enter the encoder 1220. A task of the encoder 1220 is to perform the multiplication of the Hadamard matrix H with the vector of n signals leaving the balancer 1210. The output of the encoder 1220 corresponds to the vector that is formed by multiplying H with the vector of signals leaving the balancer 1210. The output of the encoder 1220 is fed to the signal path driver drivers 1225 which possibly perform additional amplification and/or filtering. Furthermore, the signal path driver may act as a transducer making the signal suitable for transmission on the bus 120 (FIG. 1).

Figure 12B:
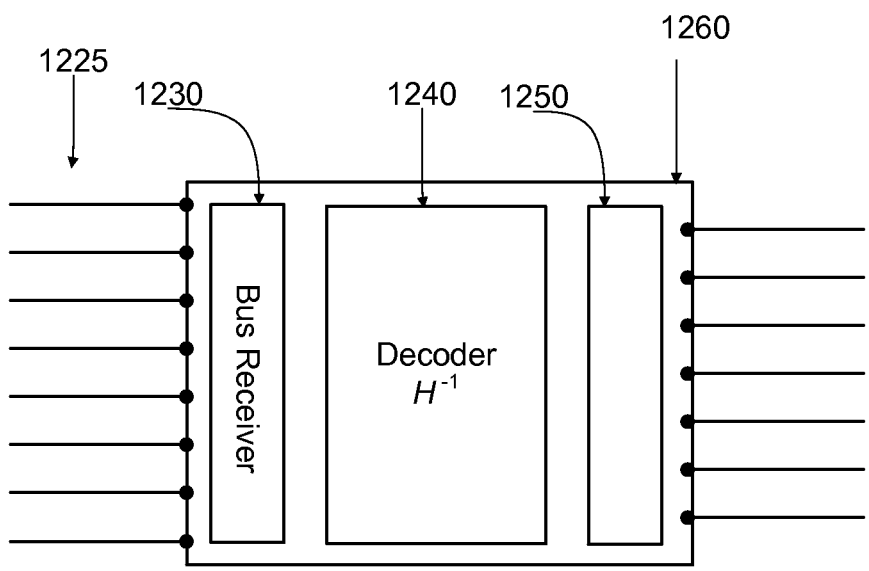
FIG. 12b is a schematic diagram depicting aspects of another example detransformer in accordance with at least one embodiment of the invention.

The detransformer 1260 described in FIG. 12*b* includes a bus receiver 1230, a decoder 1240 and a detector 1250, n signals 1225 coming from the bus 120 (FIG. 1) and possibly corrupted by various types of noise as described above. The bus receiver 1230 may amplify the signal and possibly apply some filtering and equalization. Thereafter, the signals are forwarded to decoder 1240. A task of the decoder is to multiply the n incoming signals with the inverse $H^{-1}$ of the matrix H used at the transformer 1201.

In accordance with at least one embodiment of the invention, the pin-efficiency of communicating utilizing the transformer 1201 and the detransformer 1260 is (n−1)/n.

Figure 13:
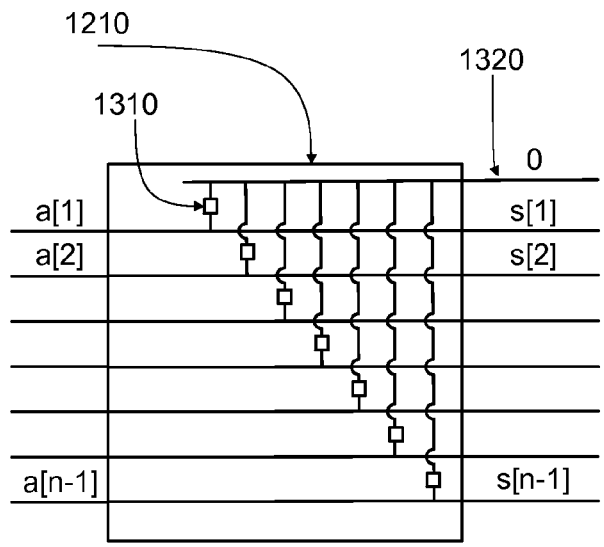
FIG. 13 is a schematic diagram depicting aspects of an example balancer in accordance with at least one embodiment of the invention.

Example operation of the balancer 1210 presenting accordance with at least one embodiment of the invention is described with reference to FIG. 13. The inputs to the balancer 1210 are denoted by a[1], . . . , a[n−1]. The output of the balancer 1210 includes n signals of which the first 1320 is set to a value of V. The balancer uses units such as balancing unit 1310 to set the other output signals s[1], . . . , s[n−1] to a[i]−V for i=1, 2, . . . , n−1. Where signals are transmitted by means of difference in amplitude, the task of units 1310 is to read the incoming values, and put an amplitude difference on the outgoing wires with respect to "additional" wire 1320. Since only differences in amplitude are considered, the value of the signal on this additional wire can be thought of as zero (0). The output of the balancer is the signal "0" on wire 1320, and values s[1], . . . , s[n−1] on the other outgoing wires. Where the output of the balancer on wire 1320 is 0, the values s[1], . . . , s[n−1] can be substantially equal to the values of their counterparts a[1], . . . , a[n−1]. It is not necessary that the signals are transmitted as voltage differences. Other types of differences can work in accordance with at least one embodiment of the invention.

Properties of Orthogonal Differential Vector Signaling

Orthogonal differential vector signaling in accordance with at least one embodiment of the invention has a number of pertinent properties including:

Resilience to common mode noise: common mode noise as described above is additive noise of a same magnitude on each signal path of the bus 120 (FIG. 1). Orthogonal differential vector signaling is resistant to this type of noise. If the signal vector (S[0],s[1], . . . , s[n−1]) is sent over the bus 120, and the signal (s[0]+v, s[1]+v, . . . , s[n−1]+v) is received at the detransformer 130, then the operation of the decoder 1240 (FIG. 12) on this vector is equivalent to its multiplication from the left by the inverse of the Hadamard matrix H. Since the Hadamard matrix is orthogonal, its inverse is its transposed matrix, which is again a Hadamard matrix. The output of the decoder 1240 is then equal to $$H^{-1}\begin{pmatrix} s[0]+v \\ s[1]+v \\ \vdots \\ s[n-2]+v \\ s[n-1]+v \end{pmatrix} = H^{-1}\begin{pmatrix} s[0] \\ s[1] \\ \vdots \\ s[n-2] \\ s[n-1] \end{pmatrix} + \begin{pmatrix} * \\ 0 \\ \vdots \\ 0 \\ 0 \end{pmatrix}.$$

wherein we have assumed that the Hadamard matrix H is chosen in such a way that the irrelevant output of its inverse is the first one. Accordingly, the common mode noise may affect the irrelevant output of the decoder 1240, but not the decoding and later detection of the data.

Resilience to independent noise: Since the Hadamard matrix is an orthogonal matrix, the multiplication of this matrix with a vector including independent Gaussian noise variables is a vector of independent Gaussian noise variables of the same noise level. A detector 1250 can be constructed that operates independently on the outputs of the decoder 1240 without incurring a performance loss. This makes detection easy and suitable for hardware implementation. In some cases detection may be performed units later in the communication chain. For these units the encoder 1220 and decoder 1240 described in this disclosure may be transparent and/or hidden. It may be that, accordingly, such units do not have to cope with a more complex noise structure.

Resilience to SSO noise: Since the Hadamard matrix is orthogonal, the total energy of the input signals before encoding can correspond to the total energy after encoding. This property makes this signaling resistant to SSO noise.

Resilience to Reference noise: Since orthogonal differential vector signaling need not require a common reference between the sender and the receiver of the signals, the method can be resistant to reference noise.

Relatively High Pin-efficiency: unlike conventional differential signaling which can have a pin-efficiency near 50%, the pin-efficiency of orthogonal differential vector signaling in accordance with embodiments of the invention may approach the perfect pin-efficiency of 100%, as it may correspond to (n−1)/n. For example, where n is 32, the pin-efficiency may be 31/32 which is almost equal to 97%. Where n is 64, the pin-efficiency may approach 98.5%.

Hybrid Orthogonal Differential Vector Signaling

In certain applications it may be desirable to subdivide the signaling paths of the bus 120 (FIG. 1) into smaller groups and to perform orthogonal differential vector signaling with respect to these smaller groups, rather than with respect to the entire set of signaling paths at one time. For example, it may be the case that the width of the bus 120 (e.g., with respect to physical distance) makes the common mode noise assumption a realistic one only for a relatively small group of adjacent signal paths. In other applications it is possible that the additional cost of the encoder 1220 (FIG. 12) and the decoder 1240 is problematic. In such cases a hybrid method in accordance with at least one embodiment of the invention may be preferable.

Figure 14A:
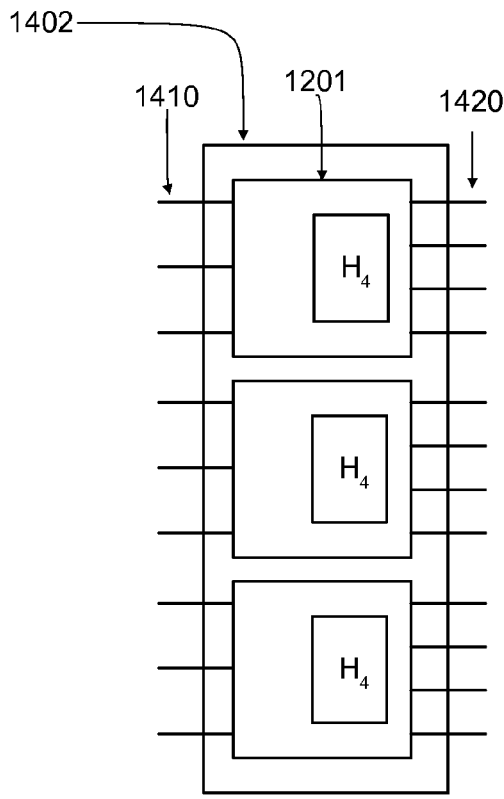
FIG. 14a is a schematic diagram depicting aspects of an example hybrid transformer in accordance with at least one embodiment of the invention.
Figure 14B:
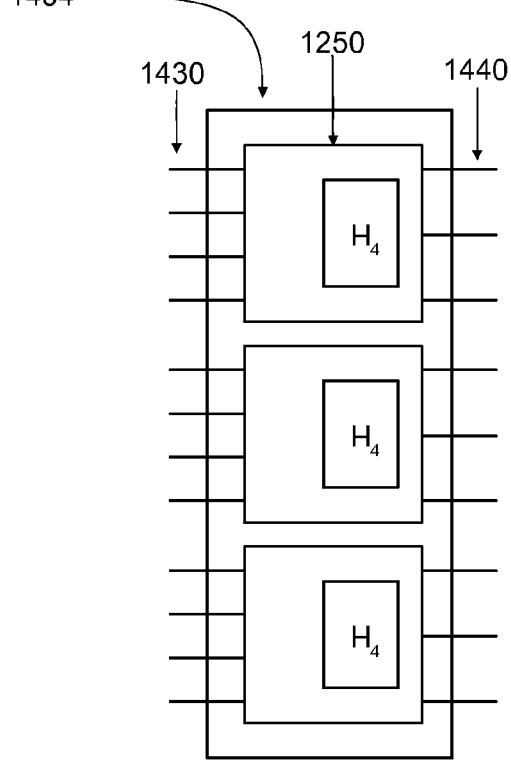
FIG. 14b is a schematic diagram depicting aspects of an example hybrid detransformer in accordance with at least one embodiment of the invention.

An example method of hybrid orthogonal differential vector signaling in accordance with at least one embodiment of the invention is now described with reference to FIGS. 14a and 14b. The example transformer 1402 in FIG. 14a has 9 incoming signals 1410 and sends 12 signals 1420 over the bus 120 (FIG. 1). It therefore has a pin-efficiency of ¾ or 75%. The incoming signals 1410 are subdivided into three groups of three signals each. Each of these three groups is transformed using the transformer 1201 of FIG. 12a wherein the Hadamard matrix is the Sylvester type matrix $H_4$. Similarly, the incoming wires into an example detransformer 1404 in FIG. 14b are grouped into three groups 1430 of 4 wires each. Each of these groups is detransformed using detransformer 1250 of FIG. 12b wherein the Hadamard matrix is the Sylvester type matrix $H_4$. As can be appreciated by those of skill in the art, hybrid orthogonal differential vector signaling may have a same and/or similar resiliency to noise as orthogonal differential vector signaling.

Hybrid orthogonal differential vector signaling can also be used in situations where there is no Hadamard matrix supporting the number of incoming wires. In at least one embodiment of the invention, such situations are abundant. For example, in many communications scenarios the number of incoming wires into transformer 110 is a power of the number 2, for example 16, 32, 64, 128, or alike. To transform these signals it would be necessary to have a Hadamard matrix of size one more than a power of 2, for example, 17, 33, 65, 129, or alike. However, in at least one embodiment of the invention, Hadamard matrices of these sizes do not exist. To overcome this problem, a hybrid orthogonal differential vector signaling method in accordance with at least one embodiment of the invention can be used. An example such method is now described with reference to FIG. 15a and FIG. 15b for the case where the number of incoming wires is 32.

Figure 15A:
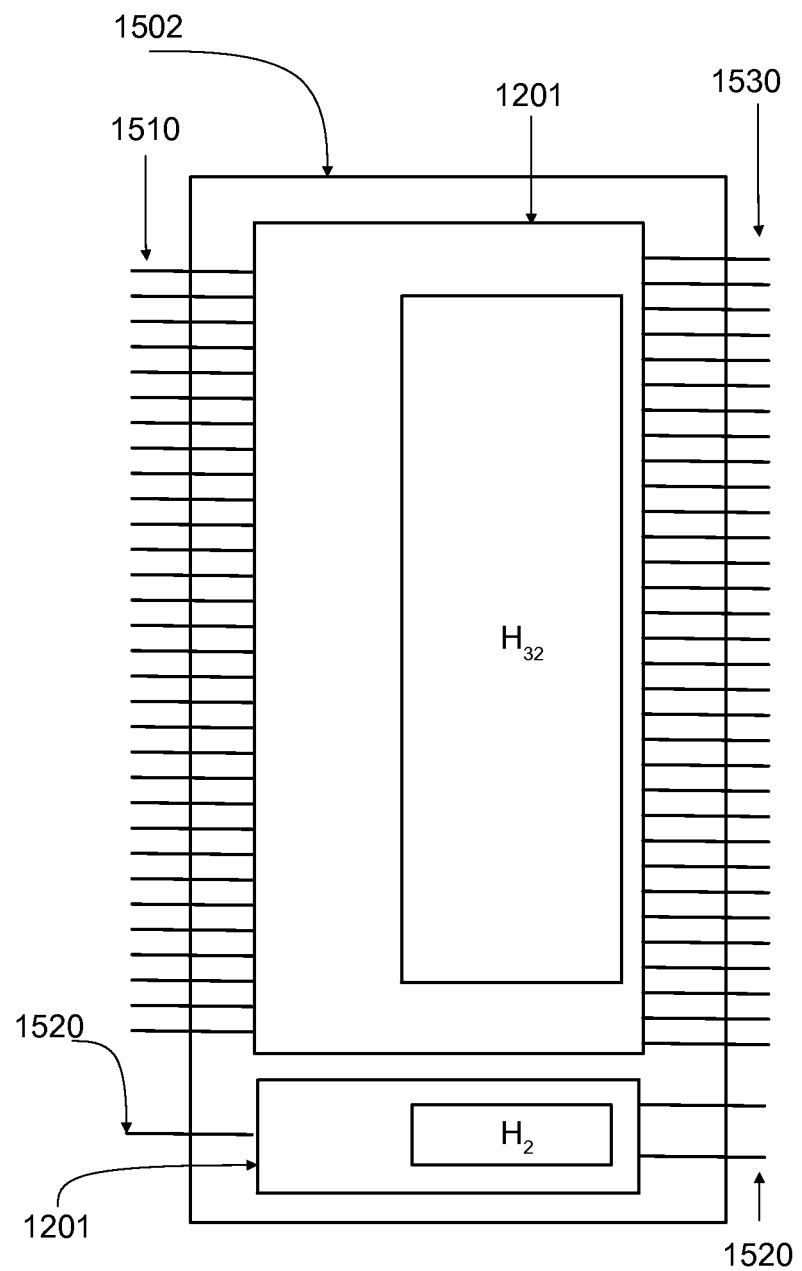
FIG. 15a is a schematic diagram depicting aspects of another example hybrid transformer in accordance with at least one embodiment of the invention.
Figure 15B:
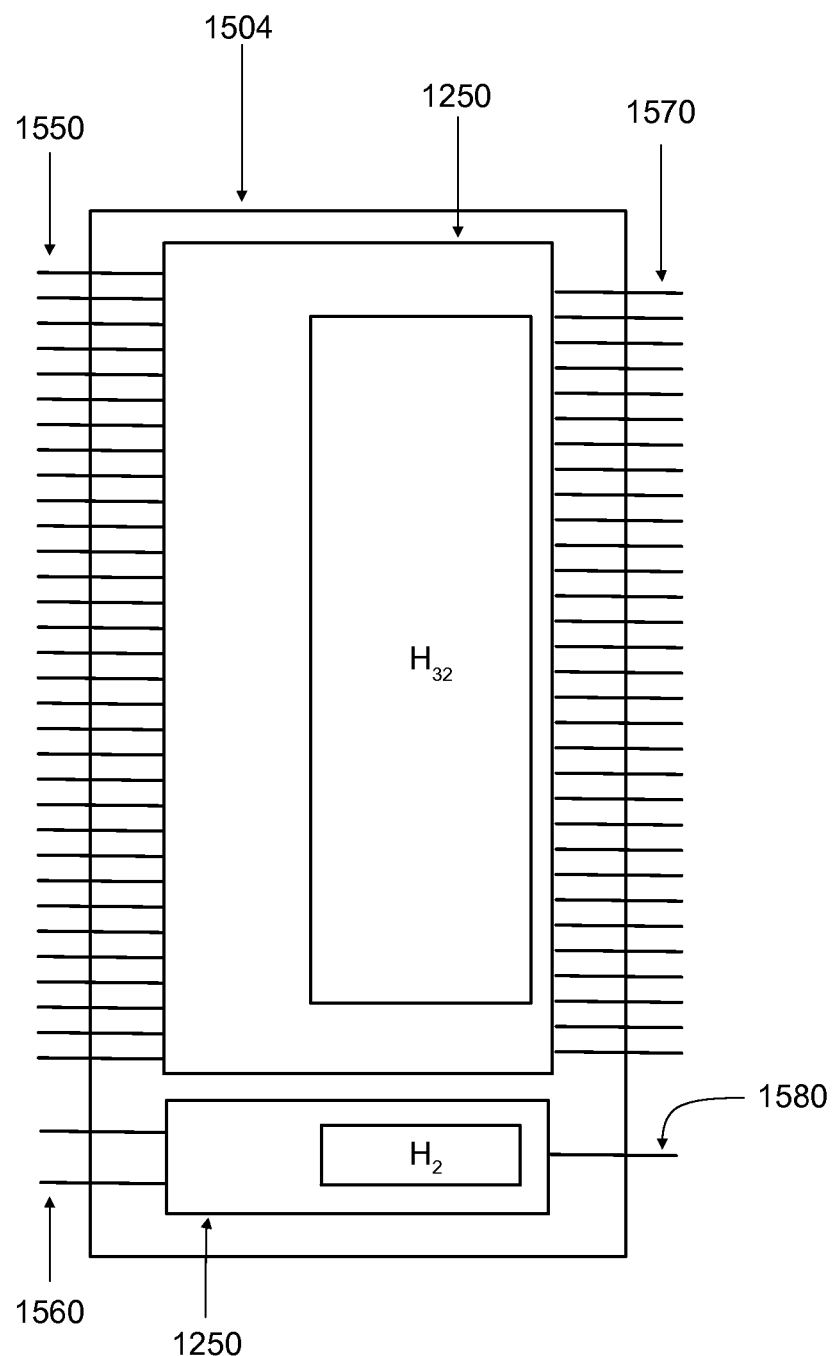
FIG. 15b is a schematic diagram depicting aspects of another example hybrid detransformer in accordance with at least one embodiment of the invention.

The example transformer 1502 in FIG. 15a has 32 incoming wires which are subdivided into a first group 1510 of 31 wires and another group 1520 of one wire. The first group 1510 is transformed using transformer 1201 of FIG. 12a wherein the Hadamard matrix is the Sylvester type matrix $H_{32}$ and the second group is transformed using a transformer that uses the Sylvester Hadamard matrix $H_2$. Correspondingly, there are 34 outgoing wires of which a group 1530 of 32 wires exit the first transformer, whereas a group 1540 of two outgoing wires exit the second transformer. Similarly, the incoming wires into transformer 1504 of FIG. 15b are grouped into two groups wherein the first group 1550 includes 32 wires and the second group 1560 includes two wires. The first group is detransformed using detransformer 1250 of FIG. 12b wherein the Hadamard matrix is the Sylvester type matrix $H_{32}$. The second group is detransformed using detransformer 1250 using the Hadamard matrix $H_2$. The pin-efficiency of this hybrid method is 32/34 which is about 94%.

Hybrid signaling can be used for any suitable number of incoming wires. For example, where the number of incoming wires is m, one can find integers $k_1 \geq k_2 \geq \ldots \geq k_r > 0$ such that $m=2^{k_1}+2^{k_2}+\ldots+2^{k_t}-t$. Subdividing the incoming wires into groups of sizes $k_1-1, k_2-1, \ldots, k_t-1$ and using Sylvester type Hadamard matrices $$H_{2^{k_1}}, H_{2^{k_2}}, \ldots, H_{2^{k_t}}.$$

will lead to a hybrid differential signaling method with pin-efficiency $m/(m+t)$. For example, when $m=24$, then we can write $$24 = 2^4 - 1 + 2^3 - 1 + 2^1 - 1 + 2^1 - 1$$

and this decomposition describes a hybrid differential vector signaling method of pin-efficiency 24/28 which is about 86%.

Multilevel Signaling

In certain applications, the information in the information storage medium 101 of FIG. 1 may include a sequence of vectors of bits, rather than of bits. In this case the signals representing these vectors of bits may be multilevel encoded. It is readily appreciated by those of skill in the art that the methods disclosed in this application can be applied to the case of multilevel signaling as well. For example, vectors corresponding to multilevel signals may be multiplied by a Hadamard matrix. The entries of the vector which is multiplied by this matrix can be any quantities that can be described by real numbers. In the case of multilevel signaling, individual entries of the vector can correspond to more than two values.

Peak Signal Value

In at least one embodiment of the invention, a further difference between orthogonal differential vector signaling and conventional differential signaling is that, in orthogonal differential vector signaling, the signals sent on the bus 120 (FIG. 1) may have an expansion of the number of signal levels. For example, in conventional differential signaling, where signals are differences of voltages with magnitudes $+a$ or $-a$, the signals on the bus 120 will all have one of these two values. However, where orthogonal differential vector signaling with the Hadamard matrix $H_4$ is used, the largest values on the bus could be twice as large. In general, when a Hadamard matrix $H_{2^n}$ is used, the maximum values on the bus can be a factor of $\sqrt{2^n}$ larger. Typically, this is not a problem, because the total energy of the signals on the wire is comparable to the total energy of the signals entering the transformer 110. However, in certain applications this may be an inconvenience.

A first solution to this problem is the use of hybrid orthogonal differential vector signaling as described above. Where $H_2^k$ is the largest size Hadamard matrix used in the hybrid method, the signals on the bus will be at most $\sqrt{2^k}$ times larger than the maximum signals entering the transformer 110 (FIG. 1). By choosing k appropriately, this factor can be made as smaller, though at the detriment of the pin-efficiency. For example, if the number of incoming wires into transformer 110 is 15, it is possible to use 5 copies of the transformer with Hadamard matrix $H_4$ to obtain a signal amplification ratio of $\sqrt{4}=2$ and a pin-efficiency of 0.75.

However, another method can be used to simultaneously keep the pin-efficiency 15/16 of the transformer with Hadamard matrix $H_{16}$ and a signal amplification ratio of 2. To achieve this, a set subset S of 16 dimensional vectors is constructed for which the entries are $+1$ and $-1$, and for which the maximum absolute value of any of the entries of the multiplication of $H_{16}$ with any of the elements of this set is at most 2. Such a subset exists, and the largest such subset has 43232 elements. By picking $2^{15}=32768$ vectors among these, and mapping each of the 32768 constellations of the incoming 15 signals uniquely to one of these vectors, the pin-efficiency of 15/16 is maintained, and the signal amplification ratio is reduced to 2.

Another example is the transformer with Hadamard matrix $H_{32}$. The pin-efficiency of this transformer is 31/32 which is about 97% and its worst case signal amplification ratio is $\sqrt{32}$ which is about 5.66. However, by computing the possible produces of $H_{32}$ with 32-dimensional vectors with entries $+1$ or $-1$, it is possible to exhibit subsets $S_1, S_2, S_3, S_4, S_5, S_6, S_7$, of sizes $2^5, 2^9, 2^{12}, 2^{24}, 2^{29}, 2^{30}, 2^{31}$ of the set of all 32-dimensional vectors with entries $+1$ or $-1$ such that the approximate worst case signal amplification ratio of these subsets is given by the following table:

| $S_1$ | $S_2$ | $S_3$ | $S_4$ | $S_5$ | $S_6$ | $S_7$ |
| --- | --- | --- | --- | --- | --- | --- |
| 0.3536 | 0.7071 | 1.061 | 1.4142 | 1.7678 | 2.1213 | 2.4749 |

For each of these subsets, by mapping constellations of incoming signal sets (of size 5, 9, 12, 24, 29, 30 and 31, respectively) uniquely to the elements of these subsets, a differential vector signaling procedure is obtained that has the following approximate pin-efficiency and signal amplification ratio:

| | $S_1$ | $S_2$ | $S_3$ | $S_4$ | $S_5$ | $S_6$ | $S_7$ |
| --- | --- | --- | --- | --- | --- | --- | --- |
| Pin-efficiency | 0.15625 | 0.28125 | 0.375 | 0.75 | 0.90625 | 0.9375 | 0.96875 |
| Amplification ratio | 0.3536 | 0.7071 | 1.061 | 1.4142 | 1.7678 | 2.1213 | 2.4749 |

Other Orthogonal and Unitary Matrices

Some of the above examples in accordance with at least one embodiment of the invention have been described with respect to Hadamard matrices. However, each embodiment of the invention is not so limited. As is appreciated by those of skill in the art, a Hadamard matrix can be replaced by any suitable orthogonal matrix. Examples of suitable orthogonal matrices in accordance with at least one embodiment of the invention include non-simple orthogonal matrices which transform a vector with similar entries into a vector that has zeros in a significant proportion (e.g., a majority) of its positions. For the purposes of this description, simple orthogonal matrices include square matrices of size 1 (i.e., 1×1 matrices) and their equivalents, the Hadamard matrix of size 2 and its equivalents, and direct sums (in the sense of group theory) of the Hadamard matrix of size 2 and their equivalents. The signal information may be encoded in the nonzero positions of the resultant vectors. If t is the maximum number of nonzero positions of such a vector, then the pin-efficiency of the corresponding orthogonal differential vector signaling scheme can be $m/(m+t)$.

Where the incoming signals can be interpreted as complex numbers, a different type of matrix can be used to obtain similar advantages as those obtained by orthogonal matrices in accordance with at least one embodiment of the invention. Such matrices include unitary matrices, which, for the purposes of this description, are matrices for which the rows are normalized to have Euclidean length one, and for which the rows are orthogonal with respect to the Hermitian scalar product. As can be appreciated by those of skill in the art, some such matrices may provide advantages similar to those of Hadamard matrices in accordance with at least one embodiment of the present invention. One example of such a matrix is $$\frac{1}{\sqrt{2}}\begin{pmatrix} 1 & 1 \\ i & -i \end{pmatrix}$$

where, as is conventional, i is the imaginary unit. Other examples could include higher Kronecker powers of this matrix. For example, the second Kronecker power of this matrix is $$\frac{1}{2}\begin{pmatrix} 1 & 1 & 1 & 1 \\ i & -i & i & -i \\ i & i & -i & -i \\ -1 & -1 & 1 & 1 \end{pmatrix}$$

Other types of unitary matrices can be envisioned which have properties similar to those of Hadamard matrices. For example, a class of such matrices can comprise all matrices of the form $$H\begin{pmatrix} a_1 & 0 & \ldots & 0 & 0 \\ 0 & a_2 & \ldots & 0 & 0 \\ \vdots & \vdots & \ddots & \vdots & \vdots \\ 0 & 0 & \ldots & a_{n-1} & 0 \\ 0 & 0 & \ldots & 0 & a_n \end{pmatrix}$$

wherein $a_1, \ldots, a_n$ are complex numbers of magnitude 1 and H is a Hadamard matrix. It is also possible to use such matrices in which $a_1, \ldots, a_n$ are not of magnitude one, but of some other magnitude (e.g., 1+$\epsilon$, where the absolute value $|\epsilon|$ is at least an order of magnitude less than one). In this case the resulting matrix is not unitary, but may be close to a unitary matrix (i.e., a "near-unitary matrix") and may be used in accordance with at least one embodiment of the present invention.

For the purposes of this description, orthogonal matrices may differentiated from unitary matrices in that orthogonal matrices have all real entries, whereas unitary matrices have at least one complex entry. Accordingly, simple unitary matrices include equivalents of simple orthogonal matrices having at least one complex entry. Furthermore, for the purposes of this description, near-orthogonal matrices are the equivalents of near-unitary matrices having all real entries, for example, matrices obtained by multiplying a Hadamard matrix with a diagonal matrix (from the left or from the right) in which the diagonal entries have absolute values that are not too large or too small. In at least one embodiment of the invention, non-simple orthogonal matrices include near-orthogonal matrices. In at least one embodiment of the invention, non-simple unitary matrices include near-unitary matrices.

Other Modes of Operation

Orthogonal differential vector signaling can be used in many different ways in accordance with embodiments of the present invention. For example, in some embodiments of the present invention, it may be desirable to sacrifice pin-efficiency for higher noise resilience. For example, where there are 32 incoming bits, a bus of size 64 can be used to transmit these bits. The values of these bits can be calculated by padding the 32 incoming values with 32 zeroes or other known values, and transforming the 64 values obtained this way using a Hadamard matrix of Sylvester type. The resulting 64 wires have a higher resilience to noise than the 64 wires obtained from the original 32 signals using pairs of differential signals. For example, if one of these pairs is subjected to a high amount of noise, then the information in that pair is entirely lost. However, by zero-padding the 32 signals with zeroes and obtaining 64 signals transmitted on wires, concentrated noise on two neighboring wires is, after the reverse Hadamard transformation, spread to a much smaller amount of noise (almost 32 times less) on every one of the 64 signals. Using conventional detection techniques, this noise can be canceled if it is not catastrophically large. The padding operation can also be used in conjunction with hybrid methods.

In another mode of operation in accordance with embodiments of the invention, the physical space reserved for signal paths can be the same as that of a conventional differential signaling method. However, given the higher pin-efficiency of methods in accordance with embodiments of the invention, the signal paths (e.g., wires) can be spread further apart, leading to smaller interference between neighboring signal paths, and hence reducing crosstalk noise. The method can be used to reduce physical signal path spacing and crosstalk noise at the same time: for example, by physically spreading the signal paths by a factor of $\sqrt{2}$ times a basic distance, the crosstalk noise may be reduced by a factor of almost 2, and the total width of the bus as compared to normal differential signaling may be reduced by another factor of $\sqrt{2}$.

Some Application Spaces and Brief Descriptions

The teachings of this disclosure are applicable in a variety of situations in which information such as digital information is to be transmitted in a tangible and/or physical form from a source to a destination. For example, where the transmission takes place with respect to a communications bus capable of physically carrying signals pertaining to the information. Below a partial list of such applications are discussed. This list is for illustrative purposes only, and is not exhaustive.

DSL Lines

Figure 16:
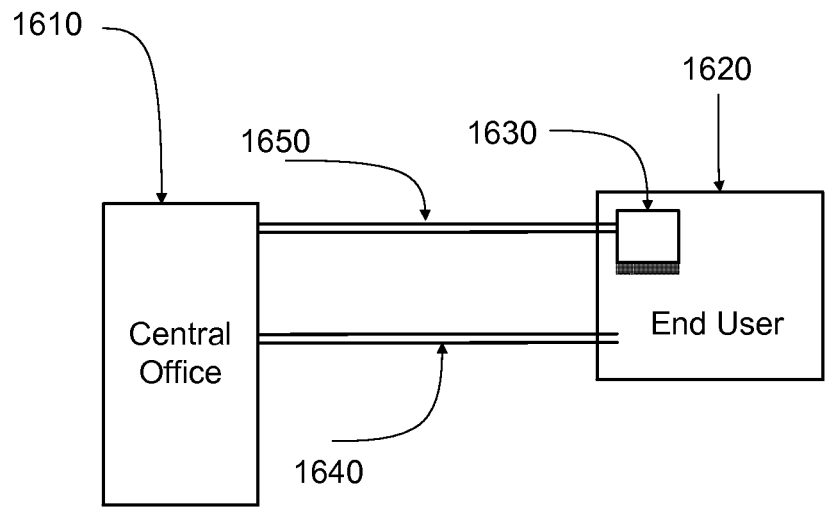
FIG. 16 is a schematic diagram depicting aspects of a conventional DSL configuration in accordance with at least one embodiment of the invention.

One application is DSL communications where Discrete Multitone (DMT) modulated signals or Quadrature Amplitude Modulation (QAM) modulated signals are sent differentially over a twisted copper pair from the central office to the customer side modem. FIG. 16 illustrates this scenario. The central office 1610 is connected to a DSL modem 1630 at an end user location 1620 (e.g., a consumer home) by a twisted pair copper wire 1650. As is often the case, there is an unused twisted pair 1640.

Figure 17:
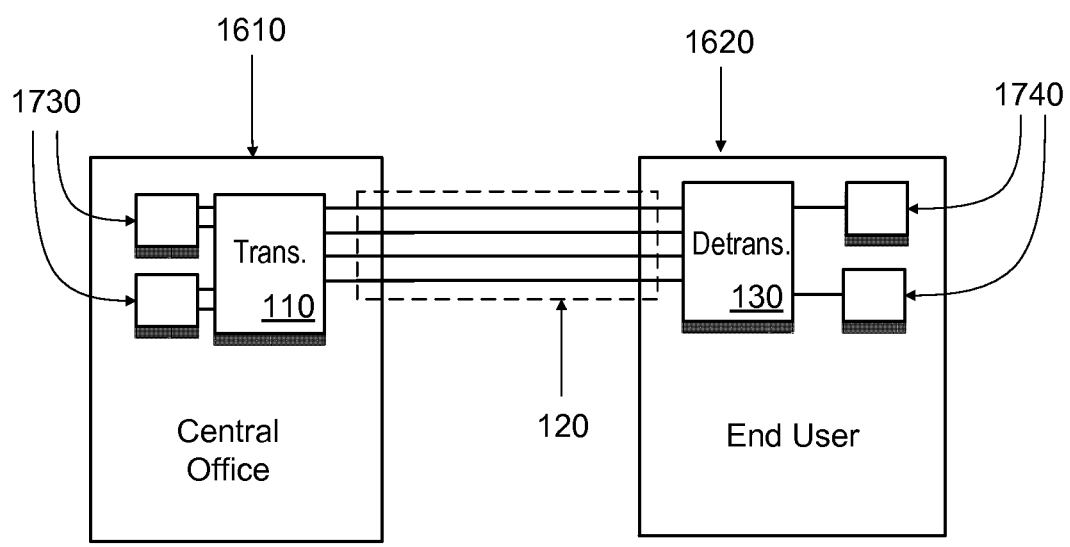
FIG. 17 is a schematic diagram depicting aspects of an enhanced DSL configuration in accordance with at least one embodiment of the invention.

The DSL communications may be enhanced by increasing the total bit rate as follows. In this case, the bus 120 (FIG. 1) is made up of the multiple twisted pairs (1640, 1650 with reference to FIG. 16). An illustration of the signaling technique applied is given in FIG. 17. At the central office 1610, the output of several modems 1730, which typically originate from a DSL Access Multiplexer (DSLAM), are fed to the transformer 110. The output of the transformer 110 is fed to the bus 120 and a detransformer 130 constructs the original signals for the modems 1740 at the consumer side.

In this case, the transformer 110 and detransformer 130 could be implemented with analog electronic circuitry such that existing DSL techniques and/or unmodified conventional DSL equipment can utilize the invention. Furthermore, the technique can be used together with link aggregation techniques to create one virtual link for the end user 1620. This would allow operators to integrate the technique into their networks and provide a link with a higher bit rate to the end users.

To give a specific example, in most countries operators have two pairs connecting the central office to the end user. In such a scenario, an embodiment of the present invention would choose a bus including 4 wires on which 3 DSL modem signals can be multiplexed. This could potentially triple the available bandwidth for the end user. In addition, the technique disclosed in this application can be combined with multiple-input multiple-output (MIMO) techniques to cancel crosstalk noise and triple the datarate on the link. Furthermore, in accordance with at least one embodiment of the invention, each signal may be spread on all wires of the bus and making it more resilient against impulse noise that occurs on one of the lines.

Chip-to-Chip Communication

Today, many electronic devices such as TVs, mobile phones, cameras and personal computers have fast processors. These processors communicate with peripheral devices such as memory by means of communication buses. Especially for high-speed memory access, increasing bandwidth is an issue. Problems in increasing bandwidth are mainly caused by an increase of noise and interference due to the high signaling speeds.

In chip-to-chip communications there are several noise sources. Some of the most important ones are noise introduced by signal path transmitters and receivers, common-mode noise and interference, simultaneous switching output noise and reference voltage noise.

Methods for chip-to-chip communications typically use either single-ended signaling, or conventional differential signaling. Orthogonal differential vector signaling in accordance with at least one embodiment of the invention has at least some of the advantages of conventional differential signaling with a much smaller expansion of the bus width (e.g., due to its relatively high pin-efficiency). One example where large gains can be obtained is CPU-to-CPU and CPU-to-memory communications in multi-core processors. For this application bandwidth may be significant. Furthermore, wide data busses can cause problems with respect to routing. Systems and methods in accordance with at least one embodiment of the invention may enable at least some of the advantages of conventional differential signaling while requiring smaller bus widths.

Optical Fiber Communication

In optical fiber communications an electrical signal carrying information is converted into light and transmitted on an optical fiber. Intensity modulation is the most common form of modulation used. Intensity modulation can be compared with single-ended signaling in the sense that a reference to which one compares the intensity of the light at the other end of the fiber has to be available. In applications, replicating the same intensity on both ends of the communication path may be difficult and costly to attain. This problem can be solved by using differential signaling. For high throughput optical fiber links, multiple fibers can be used in parallel. In accordance with at least one embodiment of the invention, it is possible to transmit n−1 information carrying signals on n optical fibers. The bus 120 would include the n fibers. Methods in accordance with at least one embodiment of the invention need not require a reference or conventional differential encoding. As will be apparent to one of skill in the art, this can lead to increased data rates and better performance with respect to noise.

Device-to-Device Communications

Devices such as mobile phones, TVs, computers, laptops, and digital cameras sometimes support interfaces for inter-device communications. Examples of communication standards are DVI, HDMI, USB, and FireWire. In all these applications the bus may include wires where mostly differential signaling is used to cope with common-mode interference. In accordance with at least one embodiment of the invention, the bus 120 (FIG. 1) may include and/or be included by the connection between two such devices. With the orthogonal differential vector signaling method, the number of wires in the cable can be substantially reduced without giving up on a common-mode noise protection. In accordance with at least another embodiment of the invention, the number of wires in the cable may be kept the same while substantially increasing the throughput of the cables.

Other instances of device-to-device communication include but are not limited to the communication between hard disks and a computer main board, the communication between expansion cards and computers and communication between networking cards over Unshielded Twisted Pair (UTP) cables. These and other suitable communication scenarios can benefit in accordance with at least one embodiment of the invention.

Example Steps

Figure 18:
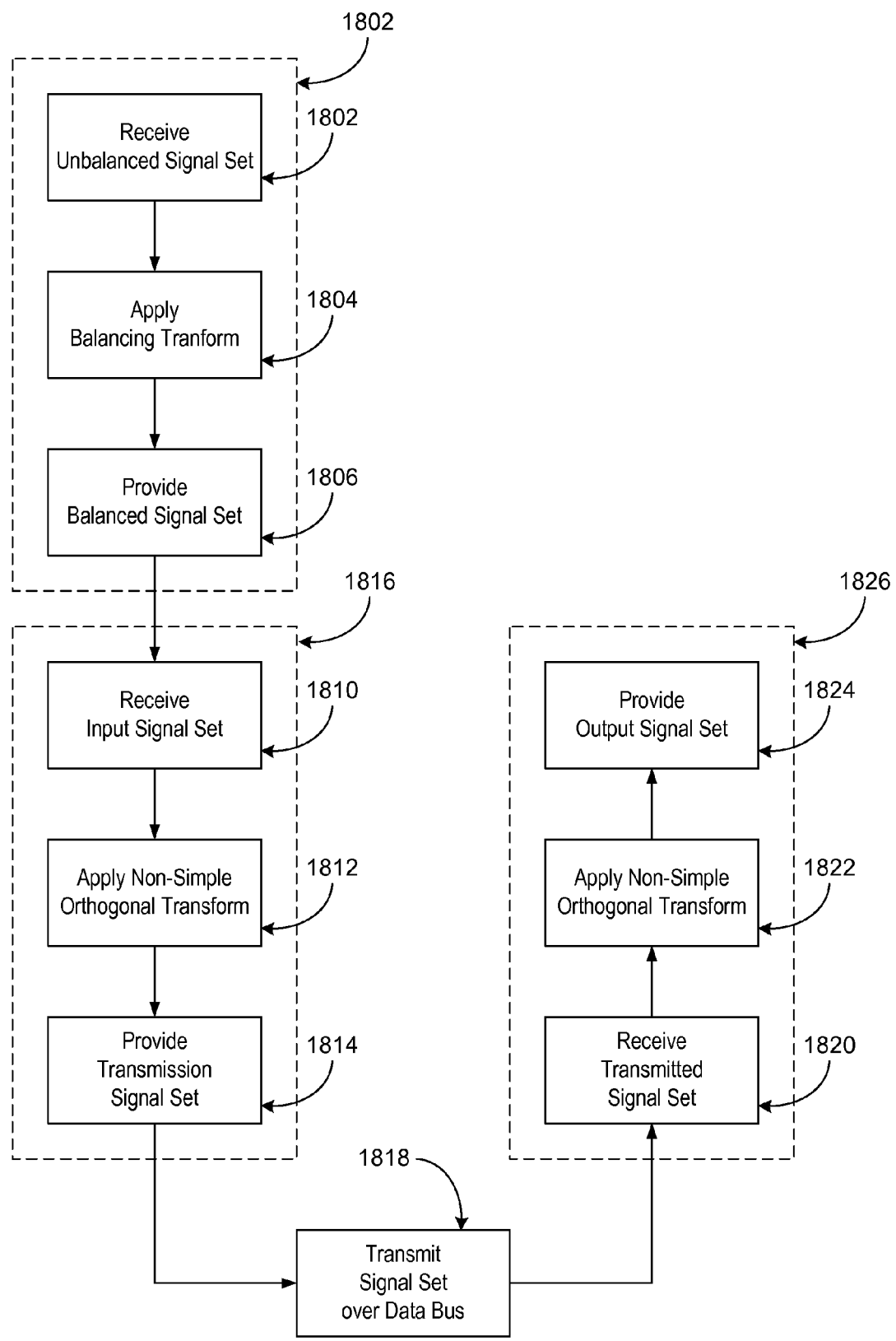
FIG. 18 is flowchart depicting example steps for orthogonal differential vector signaling in accordance with at least one embodiment of the invention.

For clarity, FIG. 18 depicts example steps that may be performed in accordance with at least one embodiment of the invention. At step 1802, an unbalanced signal set may be received. For example, the unbalanced signal set may be received by the transformer 110 (FIG. 1). At step 1804, a balancing transformation may be applied. For example, the balancer 210 (FIG. 2) may apply the balancing transformation to the unbalanced signal set received at step 1802 as at least a part of a process of forming a balanced signal set. At step 1806, a balanced signal set may be provided. For example, the balancer 210 may provide the balanced signal set formed at least in part at step 1804 to the encoder 220. The steps 1802, 1804 and 1806 are enclosed in a dash line 1808 to indicate that they may be part of a set of signal balancing steps 1808.

At step 1810, an input signal set may be received. For example, the encoder 220 (FIG. 2) may receive the input signal set. At step 1812, a non-simple orthogonal transform may be applied. For example, the encoder 220 may apply the non-simple orthogonal transform to the input signal set received at step 1810 as at least a part of a process of forming a transmission signal set. At step 1814, a transmission signal set may be provided. For example, the transformer 110 (FIG. 1) may provide the transmission signal set formed at least in part at step 1812 to the bus 120 for transmission. The steps 1810, 1812 and 1814 are enclosed in a dash line 1816 to indicate that they may be part of a set of signal encoding steps 1816.

At step 1818, a signal set may be transmitted over a data bus. For example, the transmission signal set provided to the bus 120 (FIG. 1) at step 1814 may be transmitted from a first portion of the bus 120 to a second portion of the bus 120. The first and second portions of the bus 120 may correspond to physically distinct and/or disjoint portions of the bus 120. The bus 120 may include multiple signal paths, and the bus 120 may transmit each signal in the transmission signal set over a single one of the multiple signal paths.

At step 1820, a transmitted signal set may be received. For example, the detransformer 130 (FIG. 1) may receive the transmitted signal set from the bus 120. The transmitted signal set may correspond to the transmission signal set provided at step 1814 as corrupted during its journey over the bus 120, for example, as corrupted by noise. At step 1822, a non-simple orthogonal transform may be applied. For example, the decoder 720 (FIG. 7) may apply the non-simple orthogonal transform to the transmitted signal set received at step 1820 as at least a part of a process of forming an output signal set. The non-simple orthogonal transform applied at step 1822 may correspond to the non-simple orthogonal transform applied at step 1812. For example, the non-simple orthogonal transform applied at step 1822 may be the same, similar and/or complementary to the non-simple orthogonal transform applied at step 1812. At step 1824, an output signal set may be provided. For example, the detransformer 130 may provide the output signal set formed at least in part at step 1822 to the communication device 104. The steps 1820, 1822 and 1824 are enclosed in a dash line 1826 to indicate that they may be part of a set of signal decoding steps 1826.

Preferred embodiments are described herein, including the best mode known to the inventors. Further embodiments can be envisioned by one of ordinary skill in the art after reading this disclosure. In other embodiments, combinations or subcombinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using analog or digital hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

All references, including publications, patent applications, and patents, cited herein are hereby incorporated by reference to the same extent as if each reference were individually and specifically indicated to be incorporated by reference and were set forth in its entirety herein.

What is claimed is:

1. A method of transmitting information over a multi-wire data bus, the method comprising:
    receiving a set of bits in parallel and responsively forming a first set of signals, wherein each signal in the first set has an analog value selected from a respective set of two possible analog values;
    forming a second set of signals based at least in part on the first set of signals and a set of rows of a non-simple orthogonal or unitary matrix, wherein each row of the set of rows is (i) associated with a respective signal of the first set of signals and (ii) orthogonal to a common mode row having all ones; and
    providing the second set of signals in analog form for transmission over the multi-wire data bus, wherein each signal of the second set of signals is transmitted over a respective wire of the multi-wire data bus.

2. A method of transmitting information according to claim 1, further comprising:
    forming the first set of signals based at least in part on a balancing transformation that at least ensures that the first set of signals has a size matching a size of the non-simple orthogonal or unitary matrix.

3. A method of transmitting information according to claim 2, wherein the size of the first set of physical signals is larger than a size of the set of bits.

4. A method of transmitting information according to claim 1, wherein at least one of the second set of signals has an analog signal value corresponding to a matrix multiplication of the non-simple orthogonal or unitary matrix with a vector having entries corresponding to the analog signal values of the first set of signals.

5. A method of transmitting information according to claim 4, wherein the entries of the vector correspond to real numbers.

6. A method of transmitting information according to claim 4, wherein the entries of the vector correspond to complex numbers.

7. A method of transmitting information according to claim 1, wherein the non-simple orthogonal or unitary matrix is a Hadamard matrix.

8. A method of transmitting information according to claim 1, wherein the non-simple orthogonal or unitary matrix is a Hadamard matrix having a size of at least 3.

9. A method of transmitting information according to claim 1, wherein the non-simple orthogonal or unitary matrix is a Hadamard matrix of Sylvester type.

10. A method of transmitting information according to claim 9, wherein forming the second set of signals comprises applying a Fast Hadamard-Walsh Transform configured with the Hadamard matrix of Sylvester type to the first set of signals.

11. A method of transmitting information according to claim 1, further comprising:
    receiving a third set of signals corresponding to the second set of signals; and
    forming a fourth set of signals based at least in part on the third set of physical signals and the non-simple orthogonal or unitary matrix, the fourth set of signals corresponding to the first set of signals.

12. A method of transmitting information according to claim 1, wherein the method has a pin-efficiency greater than 50%.

13. A method of transmitting information according to claim 12, wherein the pin-efficiency of the method is greater than 66%.

14. A method of transmitting information according to claim 12, wherein the pin-efficiency of the method is less than 100%.

15. A method of transmitting information according to claim 1, wherein the method has a higher noise resistance than a single-ended signaling method of transmitting the information.

16. A method of transmitting information over a multi-wire data bus incorporating multiple signal paths using analog signals, comprising:
   receiving input signals in parallel representing the information, wherein each input signal has a value selected from a respective set of two possible values;
   allocating the input signals to a plurality of input signal subsets;
   forming a plurality of transmission sets of signals corresponding to the plurality of input signal sets, each of the plurality of the transmission sets of signals based at least in part on a corresponding one of the plurality of input signal subsets, at least one of the plurality of transmission sets of signals being transformed from at least one corresponding input signal subset in accordance with at least one set of rows of at least one non-simple orthogonal or unitary matrix, wherein each row of the at least one set of rows is (i) associated with a respective signal of the input signals and (ii) orthogonal to a common mode row having all ones; and
   providing the plurality of transmission sets of signals for transmission over the multi-wire data bus using a single set of signal path drivers.

17. A method of transmitting information according to claim 16, further comprising:
   receiving a plurality of transmitted sets of analog signals corresponding to the plurality of transmission sets of signals; and
   forming an output set of signals based at least in part on the plurality of transmitted sets of analog signals, at least some of the output set of signals being transformed from at least one of the plurality of transmitted sets of analog signals corresponding to said at least one of the plurality of transmission sets of analog signals in accordance with said at least one set of rows of the at least one non-simple orthogonal or unitary matrix.

18. A system for transmitting information, comprising:
   a multi-wire data bus configured at least to transmit a transmission set of analog signals; and
   a signal encoder configured to, at least:
      receive an input set of signals in parallel representing the information, each input signal having a value selected from a respective set of at least two values;
      form the transmission set of analog signals based at least in part on the input set of signals and a set of rows of a non-simple orthogonal or unitary matrix, wherein each row of the set of rows is (i) associated with a respective input signal of the input set of signals and (ii) orthogonal to a common mode row having all ones; and
      provide the transmission set of analog signals to the multi-wire data bus for transmission, wherein each signal of the transmission set is transmitted over a respective wire of the multi-wire data bus.

19. A system for transmitting information in accordance with claim 18, further comprising a signal balancer configured to, at least:
   receive an unbalanced set of signals; and
   form the input set of signals based at least in part on the unbalanced set of signals and a balancing transformation that at least ensures that the input set of signals has a size matching a size of the non-simple orthogonal or unitary matrix.

20. A system for transmitting information in accordance with claim 18, further comprising a signal decoder configured to, at least:
   receive a transmitted set of analog signals from the data bus corresponding to the transmission set of analog signals; and
   form an output set of signals based at least in part on the transmitted set of analog signals and the non-simple orthogonal or unitary matrix, the output set of signals corresponding to the input set of signals.

21. A system for transmitting information in accordance with claim 20, wherein the signal encoder and the signal decoder are implemented with substantially similar components.

22. A system for transmitting information in accordance with claim 20, further comprising:
   a first component of a processor configured at least to provide a set of signals corresponding to the input set of signals; and
   a second component of the processor configured at least to receive a set of signals corresponding to the output set of signals.

23. A system for transmitting information in accordance with claim 18, wherein the signal encoder comprises a plurality of analog signal adders, a plurality of analog signal subtractors, and a plurality of analog signal multipliers interconnected by a plurality of signal paths.

24. A system for transmitting information in accordance with claim 18, wherein the multi-wire data bus includes at least two pairs of wires and the non-simple orthogonal or unitary matrix is of size at least 4.

25. A system for transmitting information in accordance with claim 18, wherein the multi-wire data bus includes at least two optical fibers.

* * * * *